US011427728B2

(12) United States Patent
Kehrloesser et al.

(10) Patent No.: US 11,427,728 B2
(45) Date of Patent: Aug. 30, 2022

(54) METHOD FOR PRODUCING AQUEOUS DISPERSIONS

(71) Applicant: BASF SE, Ludwigshafen am Rhein (DE)

(72) Inventors: Daniel Kehrloesser, Mannheim (DE); Joost Leswin, Mannheim (DE); Harm Wiese, Laudenbach (DE); Tobias Steinbach, Frankenthal (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 16/338,592

(22) PCT Filed: Oct. 6, 2017

(86) PCT No.: PCT/EP2017/075466
§ 371 (c)(1),
(2) Date: Apr. 1, 2019

(87) PCT Pub. No.: WO2018/065571
PCT Pub. Date: Apr. 12, 2018

(65) Prior Publication Data
US 2019/0218414 A1 Jul. 18, 2019

(30) Foreign Application Priority Data
Oct. 7, 2016 (EP) .................................... 16192863

(51) Int. Cl.
| *C09D 151/00* | (2006.01) |
| *C08F 265/06* | (2006.01) |
| *C08F 2/24* | (2006.01) |
| *C09D 7/40* | (2018.01) |
| *C08F 285/00* | (2006.01) |
| *C09D 5/02* | (2006.01) |

(52) U.S. Cl.
CPC ............ *C09D 151/003* (2013.01); *C08F 2/24* (2013.01); *C08F 265/06* (2013.01); *C08F 285/00* (2013.01); *C09D 5/02* (2013.01); *C09D 7/70* (2018.01)

(58) Field of Classification Search
CPC .................................. C08F 265/06; C08F 2/24
See application file for complete search history.

(56) References Cited

U.S. PATENT DOCUMENTS

| 7,943,704 B2 | 5/2011 | Roschmann et al. | |
| 10,377,914 B2* | 8/2019 | Kehrloesser | ......... C09D 133/12 |
| 2006/0153793 A1 | 7/2006 | Chrisstoffels et al. | |
| 2009/0012212 A1 | 1/2009 | Blankenship et al. | |
| 2011/0150818 A1 | 6/2011 | Canfield et al. | |
| 2012/0027941 A1 | 2/2012 | Fonseca et al. | |
| 2012/0129965 A1 | 5/2012 | Tuchbreiter et al. | |
| 2016/0208038 A1 | 7/2016 | Kehrloesser et al. | |
| 2016/0208128 A1 | 7/2016 | Kehrloesser et al. | |

FOREIGN PATENT DOCUMENTS

| CN | 1823099 A | 8/2006 |
| CN | 103108779 A | 5/2013 |
| CN | 105612224 A | 5/2016 |
| CN | 105637045 A | 6/2016 |
| DE | 102 11 664 A1 | 10/2003 |
| DE | 10 2004 026 904 A1 | 12/2005 |
| DE | 10 2005 009 166 A1 | 8/2006 |
| EP | 1 141 083 A2 | 10/2001 |
| EP | 2328949 A1 | 6/2011 |
| RU | 2128670 C1 | 4/1999 |
| WO | WO 96/19537 A1 | 6/1996 |
| WO | WO 99/1681 | 4/1999 |
| WO | WO 00/56802 A1 | 9/2000 |
| WO | WO 03/054204 A1 | 7/2003 |
| WO | WO 03/062306 A1 | 7/2003 |
| WO | WO 03/93343 A1 | 11/2003 |
| WO | WO 2004/020503 A1 | 3/2004 |
| WO | WO 2005/026234 A1 | 3/2005 |
| WO | WO 2005/037893 A1 | 4/2005 |
| WO | 2010/025311 A1 | 3/2010 |
| WO | WO 2015/024835 A1 | 2/2015 |
| WO | WO 2015/024882 A1 | 2/2015 |

OTHER PUBLICATIONS

International Preliminary Reporton Patentability received for PCT Patent Application No. PCT/EP2017/075466, dated Sep. 17, 2018, 9 pages. (4 pages of English Translation and 5 pages of Original Document).
International Search Report and Written Opinion received for PCT Patent Application No. PCT/EP2017/075466, dated Dec. 6, 2017, 10 pages. (2 pages of English Translation and 8 pages of Original Document).
Machine language translation of CN 103108779, retrieved on Dec. 22, 2020.
International Search Report dated Dec. 6, 2017 in PCT/EP2017/075466, citing documents AA and AG therein, 2 pages.
Charles J. McDonald, et al., "Hollow Latex Particles: Synthesis and applications" Advances in Colloid and Interface Science, vol. 99, 2002, pp. 181-213.

* cited by examiner

*Primary Examiner* — Vickey Nerangis
(74) *Attorney, Agent, or Firm* — Faegre Drinker Biddle & Reath LLP

(57) ABSTRACT

The present invention relates to a process for preparing an aqueous dispersion of polymer particles by radical aqueous emulsion polymerization and also to the use thereof in paints, paper coatings, foams, crop protection compositions, cosmetic compositions, liquid inks, or thermoplastic molding compounds.

19 Claims, No Drawings

METHOD FOR PRODUCING AQUEOUS DISPERSIONS

The present invention relates to a process for preparing an aqueous dispersion of polymer particles by radical aqueous emulsion polymerization and also to the use thereof in paints, paper coatings, foams, crop protection compositions, cosmetic compositions, liquid inks, or thermoplastic molding compounds.

Hollow organic particles are a special kind of core-shell particles which, in dried form, consist of an air-filled void surrounded by a hard sheath. Owing to this construction, they have the special property of scattering light, explaining their use as white pigments in paper coatings and in cosmetic compositions, sun creams for example. When used therein they replace part of the inorganic white titanium dioxide ($TiO_2$) pigment and also boost the effect of the remaining $TiO_2$.

C. J. McDonald and M. J. Devon, in Advances in Colloid and Interface Science 2002, 99, 181-213, describe various ways of forming these hollow particles such as inter alia swelling with organic solvents or propellants, encapsulation of hydrocarbons, or approaches based on W/O/W emulsions. However, the method which is preferred for environmental as well as economic reasons is that of osmotically swelling specific core-shell particles.

WO 2015/024882 describes a process for preparing emulsion polymer particles having a core-shell structure. The multistage emulsion polymer is obtained by sequential polymerization. Seed is prepared by radically aqueous emulsion polymerization of at least one nonionic ethylenically unsaturated monomer and at least one nonionic ethylenically unsaturated hydrophilic monomer. Thereafter a swell-seed is prepared in the presence of the seed thus obtained. Polymerized onto this swell-seed in a further polymerization step is at least one shell, to give an emulsion polymer. If the swell-seed is prepared in the presence of the seed thus obtained, the hollow organic particles obtained as emulsion polymer then only display the desired properties if relatively large amounts of crosslinker are used.

WO 2015/024835 describes a process for preparing emulsion polymer particles having a core-shell structure, where at least one nonionic, polyalkylene oxide-containing substance is used in the core. The multistage emulsion polymer is obtained by sequential polymerization of a core stage polymer and a shell stage polymer. The core stage polymer is prepared by polymerization of a swell-core. Thereafter the first and further shells are polymerized around the core.

A disadvantage found is that the aqueous dispersions of the core stage polymer, thus obtained, are not storage-stable, especially when stored for a long period at elevated temperatures.

It is an object of the present invention to provide a preparation process for emulsion polymer particles or for aqueous dispersions of emulsion polymer particles, more particularly for hollow organic particles, which are storage-stable for a prolonged period even at relatively high temperatures. Moreover, the dispersions of emulsion polymer particles ought also to have enhanced whiteness even without substantial amounts of crosslinker.

Surprisingly it has been found that these and other objects are achieved by the process described below for preparing an aqueous dispersion of polymer particles by radical aqueous emulsion polymerization.

A first subject of the invention, therefore, is a process for preparing an aqueous dispersion of polymer particles by radical aqueous emulsion polymerization, comprising the following steps:
i) preparing an aqueous dispersion of a seed polymer by radical aqueous emulsion polymerization of an aqueous monomer emulsion comprising:
  a) 25.0 to 99.9 wt %, more particularly 50.0 to 79.9 wt %, especially 60.0 to 75.0 wt % of at least one nonionic, monoethylenically unsaturated monomer M1 having a water-solubility ≤50 g/L at 20° C., based on the total weight of the monomers used in step i) and of the polyalkylene oxide-containing substance,
  b) 0 to 15.0 wt %, more particularly 0.1 to 10.0 wt %, especially 0.5 to 2.0 wt % of one or more monoethylenically unsaturated monomers M2, selected from monomers M2a which carry at least one anionic or anionogenic group and neutral monomers M2b which have a water-solubility of >50 g/L at 20° C., and mixtures thereof, based on the total weight of the monomers used in step i) and of the polyalkylene oxide-containing substance, and
  c) 0.1 to 60.0 wt %, more particularly 20.0 to 40.0 wt %, especially 24.5 to 38.0 wt % of at least one polyalkylene oxide-containing substance, based on the total weight of the monomers used in step i) and of the polyalkylene oxide-containing substance;
ii) preparing an aqueous dispersion of a swell-seed by radical aqueous emulsion polymerization of an aqueous suspoemulsion comprising:
  d) 5 to 99.9 wt %, more particularly 45.0 to 99.8 wt %, especially 65 to 99.0 wt % of at least one nonionic, monoethylenically unsaturated monomer M3 having a water-solubility ! 50 g/L at 20° C., based on the total weight of the monomers used in step ii) and of the seed polymer from step i),
  e) 0 to 75.0 wt %, more particularly 0.1 to 50.0 wt %, especially 0.5 to 30 wt % of one or more monoethylenically unsaturated monomers M4, selected from monomers M4a which carry at least one anionic or anionogenic group and neutral monomers M4b which have a water-solubility of >50 g/L at 20° C., and mixtures thereof, based on the total weight of the monomers used in step ii) and of the seed polymer from step i), and
  f) 0.1 to 20.0 wt %, 0.1 to 15.0 wt %, especially 0.5 to 5.0 wt % of the seed polymer obtained in step i), based on the total weight of the monomers used in step ii) and of the seed polymer from step i);
iii) subsequently forming at least one polymer shell by radical aqueous emulsion polymerization of shell-forming monomers M5 in the presence of the swell-seed obtained in step ii), to form an aqueous dispersion of emulsion polymer particles; and
iv) subsequently neutralizing the aqueous dispersion obtained in step iii) to a pH of at least 7.5 with at least one base.

A further subject of the invention are the aqueous polymer dispersions obtainable by the process of the invention. The polymer particles have a core-shell structure of at least three polymer phases, their monomer composition corresponding to the monomers used in steps i), ii), and iii). Moreover, the polymer particles contain included water (internal water content). The aqueous polymer dispersion prepared inventively has in particular an internal water content of 20% to 40%, especially 25% to 35%, based on the total water content of the dispersion. Furthermore, they have enhanced whiteness, or a smaller amount of crosslinker need be used to achieve the desired whiteness.

A further subject of the invention is the use of the inventively obtainable aqueous dispersion of polymer particles as paints, paper coatings, foams, crop protection compositions, cosmetic compositions, liquid inks, or thermoplastic molding compounds.

A further subject of the invention is the use of the aqueous polymer dispersion for increasing the whiteness in paints.

A further subject of the Invention are paints comprising an inventively obtainable aqueous polymer dispersion.

Through the process of the invention it is possible to provide aqueous polymer-particle dispersions that are storage-stable over a prolonged period. These dispersions are also storage-stable at elevated temperature. Moreover, the aqueous dispersions have enhanced whiteness. It is possible, furthermore, to control the particle size of the swell-core, since the particle size distribution is dependent only on the amount of seed.

For the purposes of the present invention, the expression "alkyl" encompasses linear and branched alkyl groups, especially having 1 to 30 carbon atoms, i.e., for "$C_1$-$C_{30}$ alkyl"; preferably the expression "alkyl" encompasses linear and branched alkyl groups having 1 to 20 carbon atoms, i.e., for "$C_1$-$C_{20}$ alkyl".

Suitable short-chain alkyl groups are, for example, linear or branched $C_1$-$C_7$ alkyl, preferably $C_1$-$C_6$ alkyl, and more preferably $C_1$-$C_4$ alkyl groups. These include, in particular, methyl, ethyl, propyl, isopropyl, n-butyl, 2-butyl, sec-butyl, tert-butyl, n-pentyl, 2-pentyl, 2-methylbutyl, 3-methylbutyl, 1,2-dimethylpropyl, 1,1-dimethylpropyl, 2,2-dimethylpropyl, 1-ethylpropyl, n-hexyl, 2-hexyl, 2-methylpentyl, 3-methylpentyl, 4-methylpentyl, 1,2-dimethylbutyl, 1,3-dimethylbutyl, 2,3-dimethylbutyl, 1,1-dimethylbutyl, 2,2-dimethylbutyl, 3,3-dimethylbutyl, 1,1,2-trimethylpropyl, 1,2,2-trimethylpropyl, 1-ethylbutyl, 2-ethylbutyl, 1-ethyl-2-methylpropyl, n-heptyl, 2-heptyl, 3-heptyl, 2-ethylpentyl, 1-propylbutyl, etc.

Suitable longer-chain alkyl groups are, for example, linear and branched $C_8$-$C_{30}$ alkyl groups, preferably $C_8$-$C_{20}$ alkyl groups. Preferably these are predominantly linear alkyl radicals, of the kind also occurring in natural or synthetic fatty acids and fatty alcohols, and also oxo-process alcohols. They include, for example, n-octyl, n-nonyl, n-decyl, n-undecyl, n-dodecyl, n-tridecyl, n-tetradecyl, n-pentadecyl, n-hexadecyl, n-heptadecyl, n-octadecyl, and n-nonadecyl. The expression "alkyl" encompasses unsubstituted and substituted alkyl radicals.

The statements above relating to alkyl are valid mutatis mutandis also for the alkyl groups in O-alkyl radical, for alkyl groups in alkanol, alkylamine, alkanecarboxylic acids, and alkyl esters.

The expression "alkylene" for the purposes of the present invention stands for linear or branched alkanediyl groups having 1 to 7 carbon atoms, such as, for example, methylene, 1,2-ethylene, 1,2-propylene, 1,3-propylene, 1,2-butylene, 1,3-butylene, 1,4-butylene, 2-methyl-1,2-propylene, etc.

The expression "O-alkyl" for the purposes of the present invention stands for an alkyl group as defined above which is linked to the radical molecule via an oxygen atom (O).

The expression "allyl" for the purposes of the present invention stands for a —($CH_2$)—CH=$CH_2$ group.

The expression "O-allyl" for the purposes of the present invention stands for an allyl group which is linked to the radical molecule via an oxygen atom (O).

The term "monoethylenically unsaturated $C_3$-$C_8$ monocarboxylic acid" stands for a monobasic carboxylic acid having 3 to 8 C atoms, which has one ethylenically unsaturated C=C double bond—for example, for acrylic acid, methacrylic acid, vinylacetic acid, or crotonic acid.

The term "monoethylenically unsaturated $C_4$-$C_8$ dicarboxylic acid" stands for a dibasic carboxylic acid having 4 to 8 C atoms, which has one ethylenically unsaturated C=C double bond—for example, for maleic acid, fumaric acid, itaconic acid, or citraconic acid.

Anionogenic groups for the purposes of the invention are acid groups, preferably carboxyl groups (—COOH). Anionic groups for the purposes of the invention are, in particular, deprotonated carboxyl groups and/or carboxylate groups (—COO$^-$), but also sulfonate or phosphonate groups.

Step i):

In step i) an aqueous dispersion of a seed polymer is prepared by radical aqueous emulsion polymerization of an aqueous monomer emulsion comprising the monomers M1, as defined above and below, M2, as defined above and below, and at least one polyalkylene oxide-containing substance, as defined above and below.

The seed in the context of the present invention relates to an aqueous polymer dispersion which is used at the start of the radical aqueous emulsion polymerization for preparing the aqueous dispersion of polymer particles. It is prepared by a radical aqueous emulsion polymerization of an aqueous monomer emulsion, where the polymer is obtained in the presence of the monomers M1 and optionally M2 and of at least one polyalkylene oxide-containing substance, as defined above and below.

The monomers M1 generally have a water-solubility in deionized water at 20° C. and 1 bar of ≤50 g/L, more particularly of ≤30 g/L. The water-solubility of the monomers M1 is situated typically in the range from 0.1 to 30 g/l (20° C., 1 bar).

The monomers M1 are nonionic, i.e., neutral. In an aqueous environment they are neither protonated nor act as acid.

The monomers M1 are monoethylenically unsaturated, i.e., they have exactly one ethylenically unsaturated C=C double bond. The monomers M1 are preferably selected from esters of monoethylenically unsaturated $C_3$-$C_8$ monocarboxylic acids with $C_1$-$C_{10}$ alkanols, esters of monoethylenically unsaturated $C_4$-$C_8$ dicarboxylic acids with $C_1$-$C_{10}$ alkanols, esters of vinyl alcohol or allyl alcohol with $C_1$-$C_{30}$ monocarboxylic acids, vinylaromatics, amides and diamides, monoethylenically unsaturated $C_3$-$C_8$ monocarboxylic acids with $C_1$-$C_{10}$ alkylamines, $C_4$-$C_8$ dicarboxylic adds with di-$C_1$-$C_{10}$ alkylamines, and mixtures thereof, preferably esters of monoethylenically unsaturated $C_3$-$C_8$ monocarboxylic acids with $C_1$-$C_{10}$ alkanols, esters of monoethylenically unsaturated $C_4$-$C_8$ dicarboxylic acids with $C_1$-$C_{10}$ alkanols, and mixtures thereof.

Suitable esters and diesters of monoethylenically unsaturated $C_3$-$C_8$ monocarboxylic and $C_4$-$C_8$ dicarboxylic acids with $C_1$-$C_{30}$ alkanols, more particularly with $C_1$-$C_{10}$ alkanols, are especially the esters of monoethylenically unsaturated $C_3$-$C_8$ monocarboxylic acids, more particularly the esters of acrylic acid and the esters of methacrylic add with $C_1$-$C_{30}$ alkanols, more particularly with $C_1$-$C_{10}$ alkanols, such as methyl (meth)acrylate, methyl ethacrylate, ethyl (meth)acrylate, ethyl ethacrylate, n-propyl (meth)acrylate, isopropyl (meth)acrylate, n-butyl (meth)acrylate, sec-butyl (meth)acrylate, tert-butyl (meth)acrylate, tert-butyl ethacrylate, n-hexyl (meth)acrylate, n-heptyl (meth)acrylate, n-octyl (meth)acrylate, 1,1,3,3-tetramethylbutyl (meth)acrylate, ethylhexyl (meth)acrylate, n-nonyl (meth)acrylate, n-decyl (meth)acrylate, n-undecyl (meth)acrylate, tridecyl (meth)acrylate, myristyl (meth)acrylate, pentadecyl (meth)acrylate, palmityl (meth)acrylate, heptadecyl (meth)acrylate, nonadecyl (meth)acrylate, arachinyl (meth)acrylate, behenyl (meth)acrylate, lignoceryl (meth)acrylate, cerotinyl (meth)acrylate, melissyl (meth)acrylate, palmitoleyl (meth)acrylate, oleyl (meth)-acrylate, linolyl (meth)acrylate, linolenyl (meth)acrylate, stearyl (meth)acrylate, and lauryl (meth)acrylate, but also the diesters of monoethylenically unsaturated $C_4$-$C_8$ dicarboxylic acids, more particularly the diesters of maleic acid with $C_1$-$C_{30}$ alkanols such as dimethyl maleate, diethyl maleate, di(n-propyl) maleate, diisopropyl maleate, di(n-butyl) maleate, di(n-hexyl) maleate, di(1,1,3,3-tetramethylbutyl) maleate, di(n-nonyl) maleate, ditridecyl maleate, dimyristyl maleate, dipentadecyl maleate, dipalmityl maleate, diarachinyl maleate, and mixtures thereof. The term "(meth)acrylate" here embraces both the corresponding ester of acrylic acid and the corresponding ester of methacrylic acid.

Suitable esters of vinyl alcohol and allyl alcohol with $C_1$-$C_{30}$ monocarboxylic acids are, for example, vinyl formate, vinyl acetate, vinyl propionate, vinyl butyrate, vinyl laurate, vinyl stearate, vinyl esters of Versatic acid, allyl formate, allyl acetate, allyl propionate, allyl butyrate, allyl laurate, vinyl methacrylate, allyl methacrylate, vinyl acrylate, allyl acrylate, and mixtures thereof.

Suitable vinylaromatics are styrene, 2-methylstyrene, 4-methylstyrene, 2-(n-butyl)-styrene, 4-(n-butyl)styrene, 4-(n-decyl)styrene, especially styrene.

Suitable amides and diamides of monoethylenically unsaturated $C_3$-$C_8$ monocarboxylic and $C_4$-$C_8$ dicarboxylic acids with $C_1$-$C_{30}$ alkylamines or di-$C_1$-$C_{30}$ alkylamines, more particularly with $C_1$-$C_{10}$ alkylamines or di-$C_1$-$C_{10}$ alkylamines, are especially the amides of acrylic acid and of methacrylic acid with $C_1$-$C_{30}$ alkylamines or di-$C_1$-$C_{30}$ alkylamines, more particularly with $C_1$-$C_{10}$ alkylamines or di-$C_1$-$C_{10}$ alkylamines, such as, for example, N-methyl (meth)acrylamide, N-ethyl(meth)acrylamide, N-propyl (meth)acrylamide, N-(n-butyl)(meth)acrylamide, N-(tert-butyl)(meth)acrylamide, N-(n-octyl)(meth)acrylamide, N-(1,1,3,3-tetramethylbutyl)(meth)acrylamide, N-ethylhexyl(meth)acrylamide, N-(n-nonyl)(meth)acrylamide, N-(n-decyl)(meth)acrylamide, N-(n-undecyl)(meth)acrylamide, N-tridecyl(meth)acrylamide, N-myristyl(meth)acrylamide, N-pentadecyl(meth)acrylamide, N-palmityl(meth)acrylamide, N-heptadecyl(meth)acrylamide, N-nonadecyl (meth)acrylamide, N-arachinyl(meth)acrylamide, N-behenyl(meth)acrylamide, N-lignoceryl(meth)acrylamide, N-cerotinyl(meth)acrylamide, N-melissyl(meth)acrylamide, N-palmitoleyl(meth)acrylamide, N-oleyl(meth)acrylamide, N-linolyl(meth)acrylamide, N-linolenyl(meth)acrylamide, N-stearyl(meth)acrylamide, N-lauryl(meth)acrylamide, N,N-dimethyl(meth)acrylamide, N,N-diethyl (meth)acrylamide, but also the diamides and imides of maleic acid with $C_1$-$C_{30}$ alkylamines or di-$C_1$-$C_{30}$ alkylamines, more particularly with $C_1$-$C_{10}$ alkylamines or di-$C_1$-$C_{10}$ alkylamines, such as, for example, N,N'-dimethylmaleamide, N,N'-diethylmaleamide, N,N'-dipropylmaleamide, N,N'-di(tert-butyl)maleamide, N,N'-di(n-octyl)maleamide, N,N'-di(n-nonyl)maleamide, N,N'-ditridecylmaleamide, N,N'-dimyristylmaleamide, N,N,N',N'-tetramethylmaleamide, N,N,N',N'-tetraethylmaleamide, and mixtures thereof. The term "(meth)acrylamide" here embraces both the corresponding amide of acrylic acid and the corresponding amide of methacrylic acid.

Further suitable monomers M1 are, for example, vinyl halides, vinylidene halides, and mixtures thereof.

Suitable vinyl halides and vinylidene halides are vinyl chloride, vinylidene chloride, vinyl fluoride, vinylidene fluoride, and mixtures thereof.

The at least one monomer M1 is preferably selected from esters of monoethylenically unsaturated $C_3$-$C_8$ monocarboxylic acids, especially esters of acrylic acid with $C_1$-$C_6$ alkanols, esters of methacrylic acid with $C_1$-$C_6$ alkanols, and mixtures thereof.

More preferably the at least one monomer M1 is selected from methyl acrylate, ethyl acrylate, n-butyl acrylate, tert-butyl acrylate, 2-ethylhexyl acrylate, methyl methacrylate, tert-butyl methacrylate, and mixtures thereof.

The at least one monomer M1 is especially methyl methacrylate.

In accordance with the invention, the fraction of the monomers M1, based on the total weight of the monomers used in step i) and of the polyalkylene oxide-containing substance, is in the range from 25.0 to 99.9 wt %, more particularly in the range from 50.0 to 79.9 wt %, and very preferably in the range from 60.0 to 75.0 wt %.

The monomers M2 are selected from monomers M2a which carry at least one anionic or anionogenic group and neutral monomers M2b which have a water-solubility of >50 g/L at 20° C., and mixtures thereof.

The monomers M2a generally have an anionic or anionogenic group.

A first group M2a1 of the monomers M2a are ethylenically unsaturated fatty acids, more particularly fatty acids having 10 to 24 carbon atoms and 1 to 4 double bonds in the molecule. These include linseed oil fatty acids and unsaturated fatty acids.

Suitable fatty acids are selected from ricinoleic acid, palmitoleic acid, elaidic acid, vaccenic acid, icosenoic acid, cetoleic acid, erucic acid, nervonic acid, arachidonic acid, timnodonic acid, clupanodonic acid.

A second group M2a2 of the monomers M2a are monoethylenically unsaturated, i.e., they have exactly one ethylenically unsaturated C=C double bond.

The monomers M2a2 are selected from monoethylenically unsaturated monomers having at least one carboxylate group.

Monomers M2a2 are preferably selected from monoethylenically unsaturated $C_3$-$C_8$ monocarboxylic acids, monoethylenically unsaturated $C_4$-$C_8$ dicarboxylic acids and their salts, anhydrides or methyl monoesters, monoethylenically unsaturated $C_5$-$C_8$ tricarboxylic acids and their salts, anhydrides, or their monomethyl esters, and mixtures thereof.

Suitable monoethylenically unsaturated $C_3$-$C_8$ monocarboxylic acids are selected from acrylic acid, methacrylic acid, acryloyloxypropionic acid, methacryloyloxypropionic acid, acryloyloxyacetic acid, methacryloyloxyacetic acid, crotonic acid, and their salts, anhydrides, and mixtures thereof.

Particularly preferred are acrylic acid, methacrylic acid, and mixtures thereof.

Suitable monoethylenically unsaturated $C_4$-$C_8$ dicarboxylic acids are selected from maleic acid, fumaric acid, itaconic acid, and also their salts, anhydrides, their monomethyl esters, and mixtures thereof.

Suitable monoethylenically unsaturated $C_5$-$C_8$ tricarboxylic acids are selected from aconitic acid and its salts, anhydrides, or the monomethyl esters thereof, and mixtures thereof.

The monomers M2b are generally neutral and generally have a water-solubility in deionized water at 20° C. and 1 bar of >50 g/L, more particularly of >70 g/L (20° C., 1 bar), preferably >80 g/L.

The monomers M2b are monoethylenically unsaturated, i.e., they have exactly one ethylenically unsaturated C═C double bond.

The monomers M2b are selected from monoethylenically unsaturated monomers having at least one carboxamide group.

The monomers M2b are, for example, primary amides of monoethylenically unsaturated $C_3$-$C_8$ monocarboxylic acids, and mixtures thereof.

Suitable primary amides of monoethylenically unsaturated $C_3$-$C_8$ monocarboxylic acids are selected from acrylamide, methacrylamide, and mixtures thereof.

The monomer M2 is preferably selected from monomer M2a, more particularly M2a2.

More particularly the monomer M2 is selected from acrylic acid, methacrylic acid, and mixtures thereof.

In accordance with the invention the fraction of the monomers M2, based on the total weight of the monomers used in step i) and the polyalkylene oxide-containing substance, is in the range from 0 to 15.0 wt %, more particularly in the range from preferably 0.1 to 10.0 wt %, and more preferably in the range from 0.5 to 2.0 wt %.

Polyalkylene oxide is a radical derived from identical or different $C_2$-$C_4$ oxyalkylene monomer units, having a degree of polymerization of 2 to 100, preferably 3 to 50, particularly 4 to 25, especially 5 to 10.

The polyalkylene oxide-containing substance is preferably selected from polysiloxane-polyalkylene oxide copolymers, copolymers of propylene oxide, butylene oxide or styrene oxide and ethylene oxide, block copolymers of propylene oxide and ethylene oxide, polyalkylene oxide-poly(meth)acrylate copolymers, polyalkylene oxide-(poly)alkyl copolymers, poly(alkylene oxide)-poly((meth)acrylate) block copolymer, fluorinated alkyl ester polyalkylene oxides, fluorinated polyalkoxylates, and highly branched polyalkylene oxides.

Suitable polysiloxane-polyalkylene oxide copolymers are, in particular, for example, polysiloxane-polyalkylene oxide graft copolymers, polysiloxane-polyalkylene oxide graft copolymers with α-ω structure, polysiloxane-polyalkylene oxide graft copolymers with ABA block structures, polysiloxane-polyalkylene oxide graft copolymers with BAB block structures, polysiloxane-polyalkylene oxide graft copolymers with other sequences of polyalkylene oxide-polysiloxane blocks, branched polysiloxane-polyalkylene oxide copolymers, and polysiloxane-polyalkylene oxide graft copolymers with polyester, (fluorinated) (poly)alkyl, and polyacrylate side chains, and mixtures thereof.

The polyalkylene oxide-containing substance is preferably selected from polysiloxane-polyalkylene oxide graft copolymers, polysiloxane-polyalkylene oxide graft copolymers with α-ω structure, more particularly polyalkylene oxide graft copolymers.

Suitable polysiloxane-polyalkylene oxide graft copolymers are, for example, polymers of the general formula (I):

$$R^9-\underset{R^8}{\overset{R^1}{\underset{|}{\overset{|}{Si}}}}-O-\left[\underset{R^7}{\overset{R^2}{\underset{|}{\overset{|}{Si}}}}-O\right]_n-\left[\underset{X}{\overset{R^3}{\underset{|}{\overset{|}{Si}}}}-O\right]_m-\underset{R^6}{\overset{R^4}{\underset{|}{\overset{|}{Si}}}}-R^5, \quad (I)$$

where the variables in the formula (I) have the following definitions:

$R^1$, $R^2$, $R^3$, $R^4$, $R^5$, $R^6$, $R^7$, $R^8$, $R^9$ independently of one another are H, alkyl, OH, —O-alkyl, allyl, —O-allyl, phenyl or alkyl ester;

preferably $R^1$, $R^2$, $R^3$, $R^4$, $R^5$, $R^6$, $R^7$, $R^8$, $R^9$ independently of one another are methyl;

n is 0-1000, preferably 0-500, more particularly 1-100;

m is 1-100, preferably 1-50, more particularly 1-10.

X has the following structure (Ia):

$$\xi-(CH)_t(CHR^{15})_u(CHR^{16})_v-[O-(CHR^{13})_w(CHR^{14})_x]_o-[O-(CHR^{11})_y(CHR^{12})_z]_p-R^{10}, \quad (Ia)$$

where the variables in the formula (Ia) have the following definitions:

$R^{10}$ is OH, —O-alkyl, —O-allyl, O-phenyl or an alkyl ester, preferably OH, —O-methyl or —O-butyl;

$R^{11}$, $R^{13}$, $R^{15}$ independently of one another are H, -alkyl or phenyl, preferably H;

$R^{12}$, $R^{14}$, $R^{16}$ independently of one another are H, -alkyl or phenyl, preferably H or methyl;

o is 0-100, preferably 0-50, more particularly 10-40;

p is 1-100, preferably 0-50, more particularly 10-40;

t is 0 or 2, preferably 0;

u is 0-10, preferably 0-6, more particularly 3;

v is 0-10, preferably 0-6, more particularly 3;

w, x, y, z independently of one another are 1-10, preferably 1-5, more particularly 1.

Suitable polysiloxane-polyalkylene oxide graft copolymers with α-ω-structure are, for example, polymers of the general formula (II):

$$Y-\underset{R^6}{\overset{R^1}{\underset{|}{\overset{|}{Si}}}}-O-\left[\underset{R^5}{\overset{R^2}{\underset{|}{\overset{|}{Si}}}}-O\right]_n-\underset{R^4}{\overset{R^3}{\underset{|}{\overset{|}{Si}}}}-X, \quad (II)$$

where the variables in the formula (II) have the following definitions:

$R^1$, $R^2$, $R^3$, $R^4$, $R^5$, $R^6$ independently of one another are H, alkyl, OH, O-alkyl, allyl, —O-allyl, phenyl or alkyl ester, preferably methyl;

n is 0-1000, preferably 0-500, more preferably 1-100;

X and Y Independently of one another stand for the following structure of the formula (IIa):

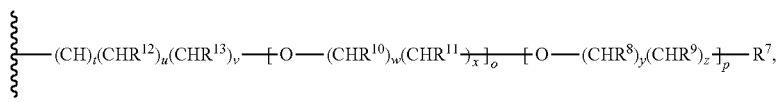

(IIa)

where the variables in the formula (IIa) have the following definitions:

R⁷ is OH, O-alkyl, —O-allyl, O-phenyl or an alkyl ester, preferably OH, O-methyl, or O-butyl;
R⁸, R¹⁰, and R¹² independently of one another are H, alkyl, or phenyl, preferably H;
R⁹, R¹¹, and R¹³ independently of one another are H, alkyl, or phenyl, preferably H or methyl;
o is 0-100, preferably 0-50, more preferably 10-40;
p is 1-100, preferably 1-50, more preferably 10-40;
t is 0 or 2, preferably 0;
u is 0-10, preferably 0-6, more preferably 3;
v is 0-10, preferably 0-6, more preferably 0;
w, x, y and z independently of one another are 1-10, preferably 1-5, more preferably 1.

Suitable polysiloxane-polyalkylene oxide graft copolymers with ABA block structures, polysiloxane-polyalkylene oxide graft copolymers with BAB block structures, or polysiloxane-polyalkylene oxide graft copolymers with other sequences of polysiloxane-polyalkylene oxide blocks are, for example, polymers of the general structures:
ABA; BAB; ABAB; BABA; ABABA; BABAB, AABB, BBAA; AABBAA, BBAABB
and other regular sequences of blocks A and B. The block A may be described, for example, by the following general formula (III):

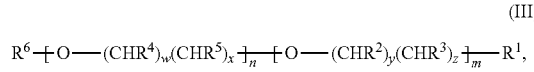

(III)

where the variables in the formula (III) have the following definitions:
R¹ and R⁶ identify the attachment points to further blocks A or B, or are an end group, for example, independently of one another, are H, alkyl, OH, O-alkyl, allyl, —O— allyl, phenyl or alkyl ester;
R² and R⁴ independently of one another are H, alkyl, or phenyl, preferably H;
R³ and R⁵ independently of one another are H, alkyl or phenyl, preferably H or methyl;
n is 0-100, preferably 0-50;
m is 1-100, preferably 1-50;
w, x, y and z independently of one another are 1-10, preferably 1-5, more preferably 1.

The block B may be described, for example, by the following general formula (IIIa):

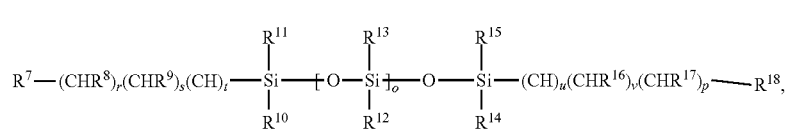

(IIIa)

where the variables in the formula (IIIa) have the following definitions:
R⁷ and R¹⁸ identify the attachment points to further blocks A or B, or are an end group, for example, independently of one another, are H, alkyl, OH, —O-alkyl, allyl, —O— allyl, phenyl or an alkyl ester;
R¹⁰, R¹¹, R¹², R¹³, R¹⁴, and R¹⁵ independently of one another are H, alkyl, OH, —O-alkyl, allyl, —O-allyl, phenyl, or an alkyl ester, preferably methyl;
R⁹, R¹⁶ independently of one another are H, alkyl, or phenyl, preferably H;
R⁸, R¹⁷ independently of one another are H, alkyl, or phenyl, preferably H or methyl;
o is 1-1000, preferably 1-100;
t and u are 0 or 2, preferably 0;
s and v are 0-10, preferably 0-6, more preferably 3;
p and r are 0-10, preferably 0-6, more preferably 0.

The block B may also be described by the following general formula (IIIb):

(IIIb)

$$R^{26}-\underset{R^{25}}{\overset{R^{18}}{\underset{|}{Si}}}-O-\left[\underset{R^{24}}{\overset{R^{19}}{\underset{|}{Si}}}-O\right]_a-\left[\underset{X}{\overset{R^{20}}{\underset{|}{Si}}}-O\right]_b-\underset{R^{23}}{\overset{R^{21}}{\underset{|}{Si}}}-R^{22},$$

where the variables in the formula (IIIb) have the following definitions:
R²² and R²⁶ identify the points of attachment to other blocks A or B, or are an end group, for example, independently of one another, are H, alkyl, OH, —O-alkyl, allyl, —O-allyl, phenyl or alkyl ester,
R¹⁸, R¹⁹, R²⁰, R²¹, R²³, R²⁴, R²⁵ independently of one another are H, alkyl, OH, —O-alkyl, allyl, —O-allyl, phenyl or alkyl ester, preferably methyl;
a is 0-1000, preferably 0-500, more preferably 1-100;
b is 1-100, preferably 1-50, more preferably 1-10;
X has the following structure of the formula (IIIc):

(IIIc)
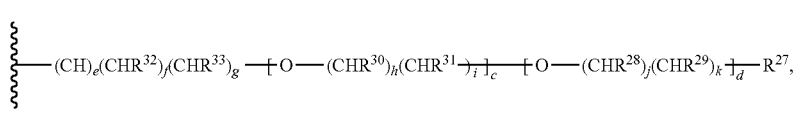

where the variables in the formula (IIIc) have the following definitions:
$R^{27}$ is OH, —O-alkyl, —O-allyl, O-phenyl or an alkyl ester, preferably OH, O-methyl or O-butyl;
$R^{28}$, $R^{30}$, and $R^{32}$ independently of one another are H, alkyl, or phenyl, preferably H;
$R^{29}$, $R^{31}$, and $R^{33}$ independently of one another are H, alkyl, or phenyl, preferably H or methyl;
c is 0-100, preferably 0-50, more preferably 10-40;
d is 1-100, preferably 1-50, more preferably 10-40;
e is 0 or 2, preferably 0;
f is 0-10, preferably 0-6, more preferably 3;
g is 0-1, preferably 0-6, more preferably 0;
h, i, j, and k independently of one another are 1-10, preferably 1-5, more preferably 1.

Suitable branched polysiloxane-polyalkylene oxide graft copolymers are, for example, polymers of the general formula (IV) or (IVa):

(IV)
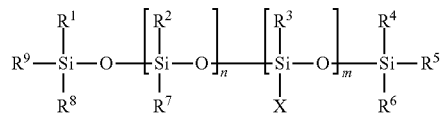

(IVa)
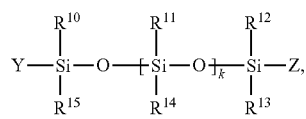

where the variables in the formula (IV) and (IVa) have the following definitions:
$R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$ independently of one another are H, alkyl, OH, —O-alkyl, allyl, —O-allyl, phenyl or alkyl ester, preferably methyl, with the proviso that at least one of the radicals $R^1$ to $R^{15}$ has the following structure of the formulae (IVb), (IVc), (IVd), (IVe), (IVf) or (IVg):

(IVb)
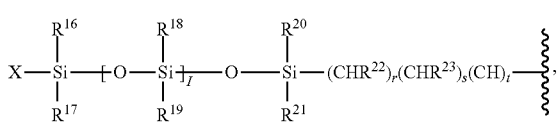

-continued (IVc)
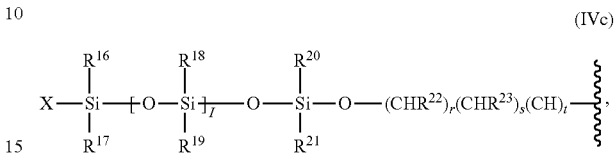

(IVd)
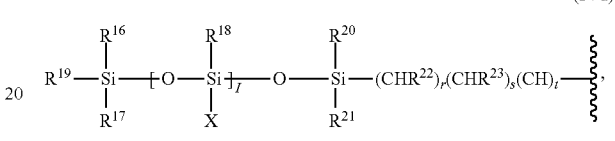

(IVe)
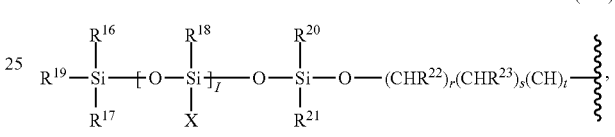

(IVf) or
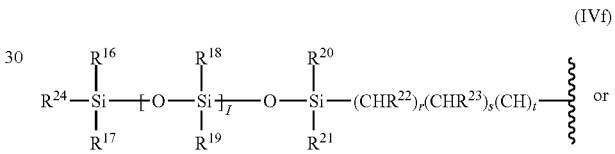

(IVg)
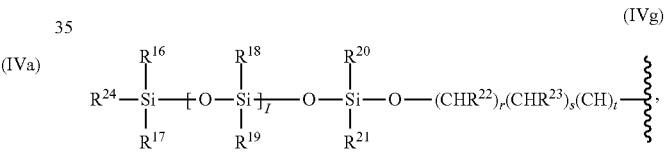

where the variables in the formula (IVb), (IVc), (IVd), (IVe), (IVf), (IVg) have the following definitions:

$R^{16}$, $R^{17}$, $R^{18}$, $R^{19}$, $R^{20}$, $R^{21}$, and $R^2$ independently of one another are H, alkyl, OH, —O— alkyl, allyl, —O-allyl, phenyl or alkyl ester, preferably methyl;

$R^{23}$ is H, alkyl or phenyl, preferably H;

$R^{22}$ is H, alkyl or phenyl, preferably H or methyl;

t is 0 or 2, preferably 0;

s is 0-10, preferably 0-6, more preferably 3;

r is 0-10, preferably 0-6, more preferably 0;

l is 1-100, preferably 1-50, more preferably 1-10;

X, Y and Z independently of one another stand for the following formula (IVh):

(IVh)
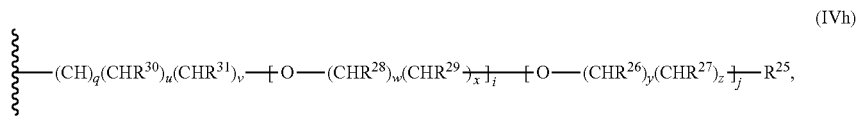

where the variables in the formula (IVh) have the following definitions:
$R^{25}$ is OH, —O-alkyl, —O-allyl, O-phenyl or alkyl ester, preferably OH, O-methyl or O-butyl;
$R^{26}$, $R^{28}$, $R^{30}$ independently of one another are H, alkyl, or phenyl, preferably H;
$R^{27}$, $R^{29}$, $R^{31}$ independently of one another are H, alkyl, or phenyl, preferably H or methyl;
i is 0-100, preferably 0-50, more preferably 10-40;
j is 1-100, preferably 1-50, more preferably 10-40;
q is 0 or 2, preferably 0;
u is 0-10, preferably 0-6, more preferably 3;
v is 0-10, preferably 0-6, more preferably 0;
w, x, y and z independently of one another are 1-10, preferably 1-5, more preferably 1;
n is 0-1000, preferably 0-500, more preferably 1-100;
k is 0-1000, preferably 0-500, more preferably 1-100;
m is 1-100, preferably 1-50, more preferably 1-10.

Suitable polysiloxane-polyalkylene oxide graft copolymers with polyester, (fluorinated) (poly)alkyl, and polyacrylate side chains are, for example, polymers of the formula (V)

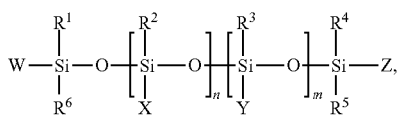
(V)

where
W, X, Y, Z independently of one another denote the following structure (Va):

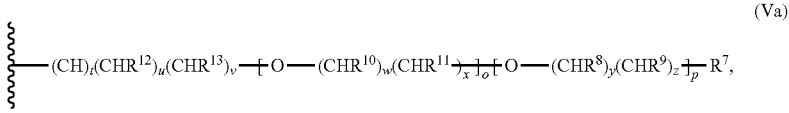
(Va)

where the variables in the formula (V) and (Va) have the following definitions:
$R^7$ is OH, —O-alkyl, —O-allyl, O-phenyl or an alkyl ester, preferably OH, O-methyl or O-butyl;
$R^8$, $R^{10}$, $R^{12}$ independently of one another are H, alkyl or phenyl, preferably H;
$R^9$, $R^{11}$, $R^{13}$ independently of one another are H, alkyl or phenyl, preferably methyl;
o is 0 to 100, preferably 0-50, more particularly 10-40;
p is 1 to 100, preferably 0-50, more particularly 10-40;
t is 0 or 2, preferably 0;
u is 0-10, preferably 0-6, more particularly 3;
v is 0-10, preferably 0-6, more particularly 0;
w, x, y, z independently of one another are 1-10, preferably 1-5, more particularly 1;
or

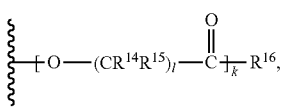
(Vb)

where the variables in the formula (Vb) have the following definitions:
$R^{14}$, $R^{15}$, and $R^{16}$ independently of one another are H, alkyl, OH, —O-alkyl, allyl, —O-allyl,
l is 1-20,
k is 1-1000,
or

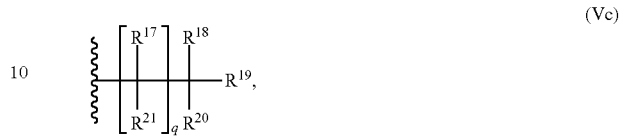
(Vc)

where the variables in the formula (Vc) have the following definitions:
$R^{17}$, $R^{18}$, $R^{19}$, $R^{20}$, and $R^{21}$ independently of one another are H, F, alkyl, OH, —O-alkyl, allyl, —O-allyl;
q is 1-1000, preferably 1-100, more preferably 1-20;
or

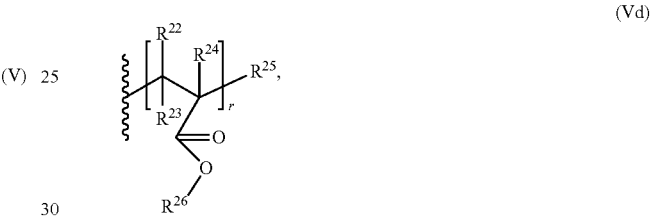
(Vd)

where the variables in the formula (Vd) have the following definitions:

$R^{22}$ and $R^{23}$ independently of one another are H or F;
$R^{24}$ is H, F or methyl;
$R^{25}$ is H, or F or alkyl, OH, —O-alkyl, allyl, —O-allyl, or (poly)alkylene oxide (—$(CR^{27}H—CH_2—O—)_s—R^{28}$);
$R^{26}$ is H, alkyl, allyl or (poly)alkylene oxide (—$(CR^{27}H—CH_2—O—)_s—R^{28}$;
r is 1-1000;
s is 1-1000;
$R^{27}$ and $R^{28}$ independently of one another are H, alkyl, OH, —O-alkyl, allyl, —O-allyl, preferably H or methyl;
$R^1$, $R^2$, $R^3$, $R^4$, $R^5$, and $R^6$ identify the points of attachment of the structure (Ve) or independently of one another are H, alkyl, OH, —O-alkyl, allyl, —O-allyl;

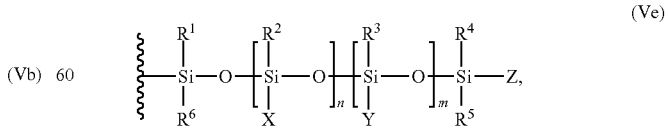
(Ve)

where $R^1$, $R^2$, $R^3$, $R^4$, $R^5$, R, X, Y, and Z have the same definition as in the superstructure of the formula (V);
n is 0-1000, preferably 0-500, more preferably 1-100;
m is 1-100, preferably 1-50, more preferably 1-10.

Suitable copolymers of propylene oxide, butylene oxide or styrene oxide and ethylene oxide are, for example, polymers of the general formula (VI):

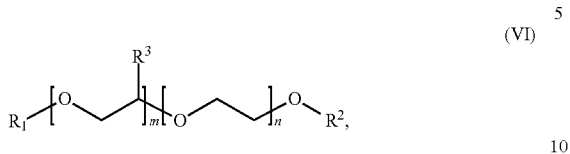

(VI)

where the variables in the formula (VI) have the following definitions:
$R^1$ is H, alkyl, allyl or alkyl ester, preferably H or alkyl, more preferably H;
$R^2$ is H, alkyl, allyl or alkyl ester, preferably H or alkyl, more preferably alkyl;
$R^3$ is H, methyl, ethyl or phenyl, preferably methyl;
n, m independently of one another are 1-1000, preferably 1-50, more preferably 1-5.

Suitable block copolymers of propylene oxide and ethylene oxide are, for example, those polymers of the general structure:
AB; BA; ABA; BAB; ABAB; BABA; ABABA; BABAB, AABB, BBAA; AABBAA, BBAABB and other regular sequences of blocks A and B.

The block A has, for example, the general formula (VII):

(VII)

where the variables in the formula (VII) have the following definitions:
$R^1$, $R^2$ identify the attachment points to further blocks A and B or are an end group, for example, independently of one another, are H, OH, alkyl, allyl, or alkyl ester;
n is 0-1000, preferably 1-50, more preferably 1-5;
where the block B has the general formula (VIIa)

(VIIa)

where the variables in the formula (VIIa) have the following definitions:
$R^3$, $R^4$ identify the attachment points to further blocks A and B or are an end group, for example, Independently of one another, are H, alkyl, OH, allyl or alkyl ester;
m is 0-1000, preferably 1-50, more preferably 1-5.

Suitable polyalkylene oxide-poly(meth)acrylate copolymers are, for example, polymers of the general formula (VIII):

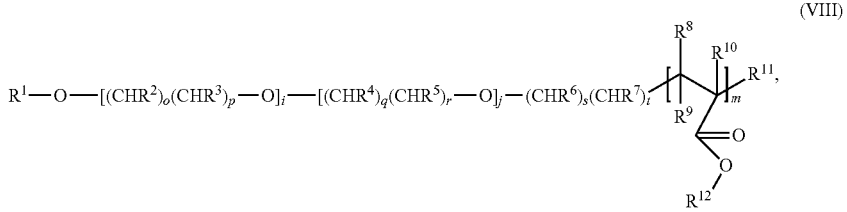

(VIII)

where the variables in the formula (VIII) have the following definitions:

$R^1$, $R^2$, $R^3$, $R^4$, $R^5$, $R^6$, $R^7$ independently of one another are H, alkyl, OH, O-alkyl, allyl, O-allyl, or alkyl ester;

i, m independently of one another are 1-1000;

j is 0-1000;

s, t independently of one another are 0-10, preferably 0-6;

o, p, q, r independently of one another are 1-10, preferably 1-5, more preferably 1; $R^8$, $R^9$ independently of one another are H or F;

$R^{10}$ is H, F, or methyl;

$R^{11}$ is H, F, alkyl, OH, —O-alkyl, allyl, —O-allyl or (poly)alkylene oxide —(CR$^{13}$H—CH$_2$—O—)$_n$—R$^{14}$, $R^{12}$ is H, alkyl, allyl or (poly)alkylene oxide —(CR$^{13}$H—CH$_2$—O—)$_n$—R$^{14}$, n is 1-1000, $R^{13}$, $R^{14}$ independently of one another are H, alkyl, OH, —O-alkyl, allyl, —O-allyl, preferably H, OH, methyl, ethyl.

Suitable poly(alkylene oxide)-poly((meth)acrylate) block copolymers are, for example, polymers of the general structure ABA; BAB; ABAB; BABA; ABABA; BABAB, AABB, BBAA; AABBAA, BBAABB, and other regular sequences of blocks A and B.

The block A may stand, for example, for the general formula (IX)

$$R^1\text{—}(CHR^2)_u(CHR^3)_v\text{—}O\text{—}[CHR^4)_o(CHR^5)_p\text{—}O\text{-}]_i\text{—}[CHR^6)_q(CHR^7)_r\text{—}O\text{-}]_j\text{—}(CHR^8)_s(CHR^9)_t\text{—}R^{10} \quad (IX)$$

where the variables in the formula (IX) have the following definitions:

$R^1$, $R^2$, $R^3$, $R^4$, $R^5$, $R^6$, $R^7$, $R^8$, $R^9$, $R^{10}$ identify the attachment points to further blocks A and B or are an end group, for example, independently of one another, are H, alkyl, OH, —O-alkyl, allyl, —O-allyl;

i, j independently of one another are 0-1000;

s, t, u, v independently of one another are 0-10, preferably 0-6;

o, p, q, r independently of one another are 1-10, preferably 1-5, more preferably 1;

where the block B, for example, has the general formula (IXa):

(IXa)

where the variables in the formula (IXa) have the following definitions:

$R^{12}$, $R^{13}$ independently of one another are H or F;

$R^{14}$ is H, F or methyl;

$R^{11}$, $R^{15}$ identify the attachment points to further blocks A and B or are an end group, for example, independently of one another, are H, F, alkyl, OH, —O— alkyl, allyl or —O-allyl;

$R^{16}$ is H, alkyl, allyl or (poly)alkylene oxide —(CR$_{17}$H—CH$_2$—O—)$_n$—R$^{18}$;

n is 1-1000, $R^{17}$, $R^{18}$ independently of one another are H, alkyl, OH, —O-alkyl, allyl or —O-allyl, preferably methyl, ethyl or OH;

m is 1-1000.

Suitable polyalkylene oxide-(poly)alkyl copolymers are, for example, polymers of the general formula (X):

(X)

where the variables in the formula (X) have the following definitions:

$R^1$, $R^2$, $R^3$, $R^4$, $R^5$, $R^6$, $R^7$, $R^8$, $R^9$ independently of one another are H, alkyl, OH, —O— alkyl, allyl or —O-allyl or alkyl ester;

i, n independently of one another are 1-1000;

j is 0-1000;

s, t, u, v independently of one another are 0-10, preferably 0-6;

o, p, q, r independently of one another are 1-10, preferably 1-5, more preferably 1;

$R^{10}$, $R^{11}$, $R^{12}$, $R^{13}$, $R^{14}$ independently of one another are H, F, alkyl, OH, —O-alkyl, allyl or —O-allyl.

Suitable (fluorinated) alkyl ester-polyalkylene oxide copolymers are, for example, polymers of the general formula (XI):

$$R^1-(CHR^2)_u(CHR^3)_v-O-[(CHR^4)_o(CHR^5)_p-O]_i-[(CHR^6)_q(CHR^7)_r-O]_j-(CHR^8)_s(CHR^9)_t\left[O-\overset{O}{\underset{\|}{C}}-(CH^{10}R^{11})_n\right]_m-R^{12}$$ (XI)

where the variables in the formula (XI) have the following definitions:

$R^1$, $R^2$, $R^3$, $R^4$, $R^5$, $R^6$, $R^7$, $R^8$, $R^9$ independently of one another are H, alkyl, OH, —O— alkyl, allyl or —O-allyl or alkyl ester;

i is 1-1000;

j is 0-1000;

s, t, u, v independently of one another are 0-20, preferably 0-12;

o, p, q, r independently of one another are 1-10, preferably 1-5, more preferably 1;

$R^{10}$, $R^{11}$, $R^{12}$ independently of one another are H, F, alkyl, OH, —O-alkyl, allyl or —O-allyl;

n is 1-20;

m is 1-1000.

Highly branched polyalkylene oxides are understood, for example, to be polymers of the kind described in EP 1 141 083, in DE 102 1 1 664, in WO 00/56802, in WO 03/062306, in WO 96/19537, in WO 03/54204, in WO 03/93343, in WO 051037893, in WO 04/020503, in DE 10 2004 026 904, in WO 99/16810, in WO 05/026234, and DE 10 2005 009 166.

In accordance with the invention, the fraction of the polyalkylene oxide-containing substance, based on the total weight of the monomers used in step i) and the polyalkylene oxide-containing substance, is in the range from 0.1 to 60.0 wt %, more particularly in the range from 20.0 to 40.0 wt %, and more preferably in the range from 24.5 to 38.0 wt %.

The volume median of the particle size of the seed polymer, determined by hydrodynamic fractionation, in the unswollen state is in the range from 10 to 100 nm.

Step ii):

The seed polymer dispersion obtained in step i) is used in step ii) for preparing an aqueous dispersion of a swell-seed. The swell-seed is obtained by radical aqueous emulsion polymerization of an aqueous suspoemulsion, comprising at least one nonionic, monoethylenically unsaturated monomer M3, as defined above and below, at least one monoethylenlcally unsaturated monomer M4, as defined above and below, in the presence of the aqueous dispersion of the seed polymer as obtained in step i).

The monomers M3 generally have a water-solubility in deionized water at 20° C. and 1 bar of a ≥50 g/L, more particularly of ≥30 g/L. The water-solubility of the monomers M3 is situated typically in the range from 0.1 to 30 g/l (20° C., 1 bar).

The monomers M3 are nonionic. i.e., neutral. In an aqueous environment they are neither protonated nor act as acid.

The monomers M3 are monoethylenically unsaturated, i.e., they have exactly one ethylenically unsaturated C=C double bond. The monomers M3 are preferably selected from esters of monoethylenically unsaturated $C_3$-$C_8$ monocarboxylic acids with $C_1$-$C_{10}$ alkanols, esters of monoethylenically unsaturated $C_4$-$C_8$ dicarboxylic acids with $C_1$-$C_{10}$ alkanols, esters of vinyl alcohol or allyl alcohol with $C_1$-$C_{30}$ monocarboxylic acids, vinylaromatics, amides and diamides, monoethylenically unsaturated $C_3$-$C_8$ monocarboxylic acids with $C_1$-$C_{10}$ alkylamines, $C_4$-$C_8$ dicarboxylic acids with di-$C_1$-$C_{10}$ alkylamines, and mixtures thereof, preferably esters of monoethylenically unsaturated $C_3$-$C_8$ monocarboxylic acids with $C_1$-$C_{10}$ alkanols, esters of monoethylenically unsaturated $C_4$-$C_8$ dicarboxylic acids with $C_1$-$C_{10}$ alkanols, and mixtures thereof.

Suitable esters and diesters of monoethylenically unsaturated $C_3$-$C_8$ monocarboxylic and $C_4$-$C_8$ dicarboxylic acids with $C_1$-$C_{30}$ alkanols, more particularly with $C_1$-$C_{10}$ alkanols, are especially the esters of monoethylenically unsaturated $C_3$-$C_8$ mono-carboxylic adds, more particularly the esters of acrylic acid and the esters of methacrylic acid with $C_1$-$C_{30}$ alkanols, more particularly with $C_1$-$C_{10}$ alkanols, such as methyl (meth)acrylate, methyl ethacrylate, ethyl (meth)acrylate, ethyl ethacrylate, n-propyl (meth)acrylate, isopropyl (meth)acrylate, n-butyl (meth)acrylate, sec-butyl (meth)acrylate, tert-butyl (meth)acrylate, tert-butyl ethacrylate, n-hexyl (meth)acrylate, n-heptyl (meth)acrylate, n-octyl (meth)acrylate, 1,1,3,3-tetramethylbutyl (meth)acrylate, ethylhexyl (meth)acrylate, n-nonyl (meth)acrylate, n-decyl (meth)acrylate, n-undecyl (meth)acrylate, tridecyl (meth)acrylate, myristyl (meth)acrylate, pentadecyl (meth)acrylate, palmityl (meth)acrylate, heptadecyl (meth)acrylate, nonadecyl (meth)acrylate, arachinyl (meth)acrylate, behenyl (meth)acrylate, lignoceryl (meth)acrylate, cerotinyl (meth)acrylate, melissyl (meth)acrylate, palmitoleyl (meth)acrylate, oleyl (meth)-acrylate, linolyl (meth)acrylate, linolenyl (meth)acrylate, stearyl (meth)acrylate, and lauryl (meth)acrylate, but also the diesters of monoethylenically unsaturated $C_4$-$C_8$ dicarboxylic acids, more particularly the diesters of maleic acid with $C_1$-$C_{30}$ alkanols such as dimethyl maleate, diethyl maleate, di(n-propyl) maleate, dilsopropyl maleate, di(n-butyl) maleate, di(n-hexyl) maleate, di(1,1,3,3-tetramethylbutyl) maleate, di(n-nonyl) maleate, ditridecyl maleate, dimyristyl maleate, dipentadecyl maleate, dipalmityl maleate, diarachinyl maleate, and mixtures thereof. The term "(meth)acrylate" here embraces both the corresponding ester of acrylic acid and the corresponding ester of methacrylic acid.

Suitable esters of vinyl alcohol and allyl alcohol with $C_1$-$C_{30}$ monocarboxylic acids are, for example, vinyl formate, vinyl acetate, vinyl propionate, vinyl butyrate, vinyl laurate, vinyl stearate, vinyl esters of Versatic acid, allyl formate, allyl acetate, allyl propionate, allyl butyrate, allyl laurate, vinyl methacrylate, allyl methacrylate, vinyl acrylate, allyl acrylate, and mixtures thereof.

Suitable vinylaromatics are styrene, 2-methylstyrene, 4-methylstyrene, 2-(n-butyl)-styrene, 4-(n-butyl)styrene, 4-(n-decyl)styrene, especially styrene.

Further suitable monomers M3 are, for example, vinyl halides, vinylidene halides, and mixtures thereof.

Suitable amides and diamides of monoethylenically unsaturated $C_3$-$C_8$ monocarboxylic and $C_4$-$C_8$ dicarboxylic acids with $C_1$-$C_{30}$ alkylamines or di-$C_1$-$C_{30}$ alkylamines, more particularly with $C_1$-$C_{10}$ alkylamines or di-$C_1$-$C_{10}$ alkylamines, are especially the amides of acrylic acid and of methacrylic acid with $C_1$-$C_{30}$ alkylamines or di-$C_1$-$C_{30}$ alkylamines, more particularly with $C_1$-$C_{10}$ alkylamines or di-$C_1$-$C_{10}$ alkylamines, such as, for example, N-methyl (meth)acrylamide, N-ethyl(meth)acrylamide, N-propyl (meth)acrylamide, N-(n-butyl)(meth)acrylamide, N-(tert-butyl)(meth)acrylamide, N-(n-octyl)(meth)acrylamide, N-(1,1,3,3-tetramethylbutyl)(meth)acrylamide, N-ethylhexyl(meth)acrylamide, N-(n-nonyl)(meth)acrylamide. N-(n-decyl)(meth)acrylamide, N-(n-undecyl)(meth)acrylamide, N-tridecyl(meth)acrylamide, N-myristyl(meth)acrylamide, N-pentadecyl(meth)acrylamide, N-palmityl(meth)acrylamide, N-heptadecyl(meth)acrylamide, N-nonadecyl (meth)acrylamide, N-arachinyl(meth)acrylamide, N-behenyl(meth)acrylamide, N-lignoceryl(meth)acrylamide, N-cerotinyl(meth)acrylamide, N-melissyl(meth)acrylamide, N-palmitoleyl(meth)acrylamide, N-oleyl(meth)acrylamide, N-linolyl(meth)acrylamide, N-linolenyl(meth)acrylamide, N-stearyl(meth)acrylamide, N-lauryl(meth)acrylamide, N,N-dimethyl(meth)acrylamide, N,N-diethyl (meth)acrylamide, but also the diamides and imides of maleic acid with $C_1$-$C_{30}$ alkylamines or di-$C_1$-$C_{30}$ alkylamines, more particularly with $C_1$-$C_{10}$ alkylamines or di-$C_1$-$C_{10}$ alkylamines, such as, for example, N,N'-dimethylmaleamide, N,N'-diethylmaleamlde, N,N'-dipropylmaleamlde, N,N'-di(tert-butyl)maleamide, N,N'-di(n-octyl)maleamide, N,N'-di(n-nonyl)maleamide, N,N'-ditrdecylmaleamide, N,N'-dimyristylmaleamide, N,N,N',N'-tetramethylmaleamide, N,N,N',N'-tetraethylmaleamide, and mixtures thereof. The term "(meth)acrylamide" here embraces both the corresponding amide of acrylic acid and the corresponding amide of methacrylic acid.

Suitable vinyl halides and vinylidene halides are vinyl chloride, vinylidene chloride, vinyl fluoride, vinylidene fluoride, and mixtures thereof.

At least one monomer M3 is preferably selected from esters of monoethylenically unsaturated $C_3$-$C_5$ monocarboxylic acids, especially esters of acrylic acid with $C_1$-$C_6$ alkanols, esters of methacrylic acid with $C_1$-$C_6$ alkanols, and mixtures thereof.

More preferably at least one monomer M3 is selected from methyl acrylate, ethyl acrylate, n-butyl acrylate, tert-butyl acrylate, 2-ethylhexyl acrylate, methyl methacrylate, tert-butyl methacrylate.

At least one monomer M3 is especially methyl methacrylate.

In accordance with the invention, the fraction of the monomers M3, based on the total weight of the monomers used in step ii) and of the seed polymer, is in the range from 5.0 to 99.9 wt %, more particularly in the range from 45.0 to 99.8 wt %, and very preferably in the range from 65.0 to 99.0 wt %.

The monomers M4 are selected from monomers M4a which carry at least one anionic or anionogenic group and neutral monomers M4b which have a water-solubility of >50 g/L at 20° C., and mixtures thereof.

The monomers M4a generally have an anionic or anionogenic group.

A first group M4a1 of the monomers M4a are selected from ethylenically unsaturated fatty acids, more particularly fatty acids having 10 to 24 carbon atoms and 1 to 4 double bonds in the molecule. These include linseed oil fatty acids and unsaturated fatty acids.

Suitable linseed oil fatty acids are selected from oleic acid, linoleic acid, and linolenic acid.

Suitable unsaturated fatty acids are selected from ridnoleic acid, palmitoleic acid, elaldic acid, vaccenic acid, icosenoic add, cetoleic acid, erucic acid, nervonic acid, arachidonic acid, timnodonic acid, clupanodonic acid.

A second group M4a2 of the monomers M4a are monoethylenically unsaturated, i.e., they have exactly one ethylenically unsaturated C=C double bond.

The monomers M4a2 are selected from monoethylenically unsaturated monomers having at least one carboxylate group.

Monomers M4a2 are preferably selected from monoethylenically unsaturated $C_3$-$C_8$ monocarboxylic acids, monoethylenically unsaturated $C_4$-$C_8$ dicarboxylic acids and their salts, anhydrides or methyl monoesters, monoethylenically unsaturated $C_5$-$C_8$ tricarboxylic acids and their salts, anhydrides, or their monomethyl esters, and mixtures thereof.

Suitable monoethylenically unsaturated $C_3$-$C_8$ monocarboxylic acids are selected from acrylic acid, methacrylic acid, acryloyloxypropionic acid, methacryloyloxypropionic acid, acryloyloxyacetic acid, methacryloyloxyacetic acid, crotonic acid, and their salts, anhydrides, and mixtures thereof.

Particularly preferred are acrylic acid, methacrylic acid, and mixtures thereof.

Suitable monoethylenically unsaturated $C_4$-$C_8$ dicarboxylic acids are selected from maleic acid, fumaric acid, itaconic acid, and also their salts, anhydrides, their monomethyl esters, and mixtures thereof.

Suitable monoethylenically unsaturated $C_5$-$C_8$ tricarboxylic acids are selected from aconitic acid and its salts, anhydrides, or the monomethyl esters thereof, and mixtures thereof.

The monomers M4b are generally neutral and generally have a water-solubility in deionized water at 20° C. and 1 bar of >50 g/L, more particularly of >70 g/L (20° C., 1 bar), preferably >80 g/L.

The monomers M4b are monoethylenically unsaturated, i.e., they have exactly one ethylenically unsaturated C=C double bond.

The monomers M4b are selected from monoethylenically unsaturated monomers having at least one carboxamide group.

The monomers M4b are, for example, primary amides of monoethylenically unsaturated $C_3$-$C_8$ monocarboxylic acids, and mixtures thereof.

Suitable primary amides of monoethylenically unsaturated $C_3$-$C_8$ monocarboxylic acids are selected from acrylamide, methacrylamide, and mixtures thereof.

The monomer M4 is preferably selected from M4a, more particularly M4a2.

More particularly the monomer M4 is selected from acrylic acid, methacrylic acid, and mixtures thereof.

In accordance with the invention the fraction of the monomers M4, based on the total weight of the monomers used in step ii) and the seed polymer, is in the range from 0 to 75.0 wt %, more particularly in the range from preferably 0.1 to 50.0 wt %, and more preferably in the range from 0.5 to 30.0 wt %.

In accordance with the invention, the fraction of the seed polymer obtained in step i), based on the total weight of the monomers used in step ii) and of the seed polymer, is in the range from 0.1 to 20.0 wt %, more particularly in the range from 0.1 to 15.0 wt %, and more preferably in the range from 0.5 to 5.0 wt %.

In accordance with the invention, the volume median of the particle size of the swell-seed, determined by hydrodynamic fractionation, in the unswollen state is in the range from 50 to 300 nm. Preferably the volume median of the particle size of the swell-seed, determined by hydrodynamic fractionation, in the unswollen state is in the range from 50 to 200 nm.

Step iii):

In step iii), at least one polymer shell is formed by radical aqueous emulsion polymerization reaction of the swell-seed obtained in step ii), in the presence of shell-forming monomers M5. Subsequently, in accordance with the invention, an aqueous dispersion of emulsion polymer particles is obtained.

The shell-forming monomers M5 are selected from nonionic monoethylenically unsaturated monomers M5-1, having a water-solubility of a ≥50 g/L at 20° C., monoethylenically unsaturated monomers M5-2, selected from monomers M5-2a which carry at least one anionic or anionogenic group and neutral monomers M5-2b which have a water-solubility of >50 g/L at 20° C., and mixtures thereof.

The monomers M5-1 generally have a water-solubility in deionized water at 20° C. and 1 bar of ≥50 g/L, more particularly of ≥30 g/L. The water-solubility of the monomers M5-1 is situated typically in the range from 0.1 to 30 g/l (20° C., 1 bar).

The monomers M5-1 are nonionic, i.e., neutral. In an aqueous environment they are neither protonated nor act as acid.

The monomers M5-1 are monoethylenically unsaturated, i.e., they have exactly one ethylenically unsaturated C=C double bond. The monomers M5-1 are preferably selected from esters of monoethylenically unsaturated $C_3$-$C_8$ monocarboxylic acids with $C_1$-$C_{10}$ alkanols, esters of monoethylenically unsaturated $C_4$-$C_8$ dicarboxylic acids with $C_1$-$C_{10}$ alkanols, esters of vinyl alcohol or allyl alcohol with $C_1$-$C_{30}$ monocarboxylic acids, vinylaromatics, amides and diamides, monoethylenically unsaturated $C_3$-$C_8$ monocarboxylic acids with $C_1$-$C_{10}$ alkylamines, $C_4$-$C_8$ dicarboxylic acids with di-$C_1$-$C_{10}$ alkylamines, and mixtures thereof, preferably esters of monoethylenically unsaturated $C_3$-$C_8$ monocarboxylic acids with $C_1$-$C_{10}$ alkanols, esters of monoethylenically unsaturated $C_4$-$C_8$ dicarboxylic acids with $C_1$-$C_{10}$ alkanols, and mixtures thereof.

Suitable esters and diesters of monoethylenically unsaturated $C_3$-$C_8$ monocarboxylic and $C_4$-$C_8$ dicarboxylic acids with $C_1$-$C_{30}$ alkanols, more particularly with $C_1$-$C_{10}$ alkanols, are especially the esters of monoethylenically unsaturated $C_3$-$C_8$ mono-carboxylic adds, more particularly the esters of acrylic acid and the esters of methacrylic acid with $C_1$-$C_{30}$ alkanols, more particularly with $C_1$-$C_{10}$ alkanols, such as methyl (meth)acrylate, methyl ethacrylate, ethyl (meth)acrylate, ethyl ethacrylate, n-propyl (meth)acrylate, isopropyl (meth)acrylate, n-butyl (meth)acrylate, sec-butyl (meth)acrylate, tert-butyl (meth)acrylate, tert-butyl ethacrylate, n-hexyl (meth)acrylate, n-heptyl (meth)acrylate, n-octyl (meth)acrylate, 1,1,3,3-tetramethylbutyl (meth)acrylate, ethylhexyl (meth)acrylate, n-nonyl (meth)acrylate, n-decyl (meth)acrylate, n-undecyl (meth)acrylate, tridecyl (meth)acrylate, myristyl (meth)acrylate, pentadecyl (meth)acrylate, palmityl (meth)acrylate, heptadecyl (meth)acrylate, nonadecyl (meth)acrylate, arachinyl (meth)acrylate, behenyl (meth)acrylate, lignoceryl (meth)acrylate, cerotinyl (meth)acrylate, melissyl (meth)acrylate, palmitoleyl (meth) acrylate, oleyl (meth)-acrylate, linolyl (meth)acrylate. Ilnolenyl (meth)acrylate, stearyl (meth)acrylate, and lauryl (meth)acrylate, but also the diesters of monoethylenlcally unsaturated $C_4$-$C_8$ dicarboxylic acids, more particularly the diesters of malelc acid with $C_1$-$C_{30}$ alkanols such as dimethyl maleate, diethyl maleate, di(n-propyl) maleate, dilsopropyl maleate, di(n-butyl) maleate, di(n-hexyl) maleate, di(1,1,3,3-tetramethylbutyl) maleate, di(n-nonyl) maleate, ditridecyl maleate, dimyristyl maleate, dipentadecyl maleate, dipalmityl maleate, diarachinyl maleate, and mixtures thereof. The term "(meth)acrylate" here embraces both the corresponding ester of acrylic acid and the corresponding ester of methacrylic add.

Suitable esters of vinyl alcohol and allyl alcohol with $C_1$-$C_{30}$ monocarboxylic acids are, for example, vinyl formate, vinyl acetate, vinyl propionate, vinyl butyrate, vinyl laurate, vinyl stearate, vinyl esters of Versatic acid, allyl formate, allyl acetate, allyl propionate, allyl butyrate, allyl laurate, vinyl methacrylate, allyl methacrylate, vinyl acrylate, allyl acrylate, and mixtures thereof.

Suitable vinylaromatics are styrene, 2-methylstyrene, 4-methylstyrene, 2-(n-butyl)-styrene, 4-(n-butyl)styrene, 4-(n-decyl)styrene, especially styrene.

Further suitable monomers M5-1 are, for example, vinyl halides, vinylidene halides, and mixtures thereof.

Suitable amides and diamides of monoethylenically unsaturated $C_3$-$C_8$ monocarboxylic and $C_4$-$C_8$ dicarboxylic acids with $C_1$-$C_{30}$ alkylamines or di-$C_1$-$C_{30}$ alkylamines, more particularly with $C_1$-$C_{10}$ alkylamines or di-$C_1$-$C_{10}$ alkylamines, are especially the amides of acrylic acid and of methacrylic acid with $C_1$-$C_{30}$ alkylamines or di-$C_1$-$C_{30}$ alkylamines, more particularly with $C_1$-$C_{10}$ alkylamines or di-$C_8$-$C_{10}$ alkylamines, such as, for example, N-methyl (meth)acrylamide, N-ethyl(meth)acrylamide, N-propyl (meth)acrylamide, N-(n-butyl)(meth)acrylamide, N-(tert-butyl)(meth)acrylamide, N-(n-octyl)(meth)acrylamide, N-(1,1,3,3-tetramethylbutyl)(meth)acrylamide, N-ethylhexyl(meth)acrylamide, N-(n-nonyl)(meth)acrylamide, N-(n-decyl)(meth)acrylamide, N-(n-undecyl)(meth)acrylamide, N-tridecyl(meth)acrylamide, N-myristyl(meth)acrylamide, N-pentadecyl(meth)acrylamide, N-palmityl(meth)acrylamide, N-heptadecyl(meth)acrylamide, N-nonadecyl (meth)acrylamide, N-arachinyl(meth)acrylamide.

N-behenyl(meth)acrylamide, N-lignoceryl(meth)acrylamide, N-cerotinyl(meth)acrylamide, N-melissyl(meth) acrylamide, N-palmitoleyl(meth)acrylamide, N-oleyl(meth) acrylamide, N-linolyl(meth)acrylamide, N-linolenyl(meth) acrylamide. N-stearyl(meth)acrylamide, N-lauryl(meth) acrylamide, N,N-dimethyl(meth)acrylamide, N,N-diethyl (meth)acrylamide, but also the diamides and imides of maleic acid with $C_1$-$C_{30}$ alkylamines or di-$C_1$-$C_{30}$ alkylamines, more particularly with $C_1$-$C_{10}$ alkylamines or di-$C_1$-$C_{10}$ alkylamines, such as, for example, N,N'-dimethylmaleamide, N,N'-diethylmaleamide, N,N'-dipropylmaleamide, N,N'-di(tert-butyl)maleamide, N,N'-di(n-octyl)maleamide, N,N'-di(n-nonyl)maleamide, N,N'-ditridecylmaleamide, N,N'-dimyristylmaleamide, N,N,N',N'-tetramethylmaleamide, N,N,N',N'-tetraethylmaleamide, and mixtures thereof. The term "(meth)acrylamide" here embraces both the corresponding amide of acrylic acid and the corresponding amide of methacrylic acid.

Suitable vinyl halides and vinylidene halides are vinyl chloride, vinylidene chloride, vinyl fluoride, vinylidene fluoride and mixtures thereof.

At least one monomer M5-1 is preferably selected from vinylaromatics, especially styrene, esters of monoethylenically unsaturated $C_3$-$C_8$ monocarboxylic acids, especially esters of acrylic acid with $C_1$-$C_6$ alkanols, esters of methacrylic acid with $C_1$-$C_6$ alkanols, and mixtures thereof.

More preferably at least one monomer M5-1 is selected from styrene, methyl acrylate, ethyl acrylate, n-butyl acrylate, n-butyl methacrylate, tert-butyl acrylate, 2-ethylhexyl acrylate, methyl methacrylate, tert-butyl methacrylate, and mixtures thereof.

At least one monomer M5-1 is especially selected from styrene, methyl methacrylate, n-butyl methacrylate, and mixtures thereof.

In accordance with the invention, the fraction of the monomers M5-1, based on the total weight of the monomers M5 used, is in the range from 25.0 to 100.0 wt %, more particularly in the range from 60.0 to 99.9 wt %, and very preferably in the range from 90.0 to 99.0 wt %.

The monomers M5-2 are selected from monomers M5-2a which carry at least one anionic or anionogenic group and neutral monomers M5-2b which have a water-solubility of >50 g/L at 20° C., and mixtures thereof.

The monomers M5-2a generally have an anionic or anionogenic group.

A first group M5-2a1 of the monomers M5-2a are ethylenically unsaturated fatty acids, more particularly fatty acids having 10 to 24 carbon atoms and 1 to 4 double bonds in the molecule. These include linseed oil fatty acids and unsaturated fatty adds.

Suitable fatty acids are selected from ricinoleic acid, palmitoleic acid, elaidlc acid, vaccenic acid, icosenoic acid, cetoleic acid, erucic acid, nervonic acid, arachidonic acid, timnodonic acid, clupanodonic acid.

A second group M5-2a2 of the monomers M5-2a are monoethylenically unsaturated, i.e., they have exactly one ethylenically unsaturated C=C double bond.

The monomers M5-2a2 are selected from monoethylenically unsaturated monomers having at least one carboxylate group or carboxamide group.

Monomers M5-2a2 are preferably selected from monoethylenically unsaturated $C_3$-$C_8$ monocarboxylic acids, monoethylenically unsaturated $C_4$-$C_8$ dicarboxylic acids and their salts, anhydrides or methyl monoesters, monoethylenically unsaturated $C_5$-$C_8$ tricarboxylic acids and their salts, anhydrides, or their monomethyl esters, and mixtures thereof.

Suitable monoethylenically unsaturated $C_3$-$C_8$ monocarboxylic acids are selected from acrylic acid, methacrylic acid, acryloyloxypropionic acid, methacryloyloxypropionic acid, acryloyloxyacetic acid, methacryloyloxyacetic acid, crotonic acid, and their salts, anhydrides, and mixtures thereof.

Suitable monoethylenically unsaturated $C_4$-$C_8$ dicarboxylic acids are selected from maleic acid, fumaric acid, itaconic acid, and also their salts, anhydrides, their monomethyl esters, and mixtures thereof.

Suitable monoethylenically unsaturated $C_5$-$C_8$ tricarboxylic acids are selected from aconitic acid and its salts, anhydrides, or the monomethyl esters thereof, and mixtures thereof.

The monomers M5-2b are generally neutral and generally have a water-solubility in deionized water at 20° C. and 1 bar of >50 g/L, more particularly of >70 g/L (20° C., 1 bar), preferably >80 g/L.

The monomers M5-2b are monoethylenically unsaturated, i.e., they have exactly one ethylenically unsaturated C=C double bond.

The monomers M5-2b are selected from monoethylenically unsaturated monomers having at least one carboxamide group.

The monomers M5-2b are, for example, primary amides of monoethylenically unsaturated $C_3$-$C_8$ monocarboxylic acids, and mixtures thereof.

Suitable primary amides of monoethylenically unsaturated $C_3$-$C_8$ monocarboxylic acids are selected from acrylamide, methacrylamide, and mixtures thereof.

The monomer M5-2 is preferably selected from M5-2a, more particularly M5-2a1.

More particularly the monomer M5-2 is selected from acrylic acid, methacrylic acid, and mixtures thereof, especially methacrylic acid.

In accordance with the invention the fraction of the monomers M5-2, based on the total weight of the monomers M5 used, is in the range from 0.0 to 75.0 wt %, more particularly in the range from 0.1 to 40.0 wt %, and more preferably in the range from 1 to 10.0 wt %.

Step iv):

The dispersion of emulsion polymer particles that is obtained in step iii) is adjusted in step iv) to a pH of at least 7.5 with at least one base.

Suitable bases are selected from alkali metal or alkaline earth metal compounds, ammonia, primary amines, secondary amines, and tertiary amines.

Suitable alkali metal or alkaline earth metal compounds are sodium hydroxide, potassium hydroxide, calcium hydroxide, magnesium oxide, sodium carbonate, and mixtures thereof.

Suitable amines are ethylamine, propylamine, monoisopropylamine, monobutylamine, hexylamine, ethanolamine, dimethylamine, diethylamine, di-n-propylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminethylamine, 2,3-diaminopropane, 1,2-propylenediamine, dimethylaminopropylamine, neopentanediamine, hexamethylenediamine, 4,9-dioxadodecane-1,12-diamine, polyethylenimine, polyvinylamine, or mixtures thereof.

Neutralization is carried out preferably with ammonia or sodium hydroxide.

Neutralization may take place in the presence of at least one plasticizer monomer.

Neutralization may also take place after a plasticizer monomer has been added.

The neutralization in step iv) takes place preferably after a plasticizer monomer has been added.

Plasticizer monomers are those having a ceiling temperature of less than 181° C., preferably less than 95° C. If step iv) is carried out in the presence of a plasticizer monomer, the plasticizer monomer comprehends, for example, esters of monoethylenically unsaturated $C_3$-$C_8$ monocarboxylic acids with $C_1$-$C_{10}$ alkanols, esters of monoethylenically unsaturated $C_4$-$C_8$ dicarboxylic acids with $C_1$-$C_{10}$ alkanols, vinylaromatics, 2-methyl-2-butene, 2,3-dimethyl-2-butene, 1,1-diphenylethene, esters of 2-phenylacrylic acid, esters of atropic acid, and mixtures thereof, preferably vinylaromatics.

Suitable esters and diesters of monoethylenically unsaturated $C_3$-$C_8$ monocarboxylic and $C_4$-$C_8$ dicarboxylic acids with $C_1$-$C_{30}$ alkanols, more particularly with $C_1$-$C_{10}$ alkanols, are, in particular, the esters of monoethylenically unsaturated $C_3$-$C_8$ monocarboxylic acids, more particularly the esters of acrylic acid and the esters of methacrylic acid, with $C_1$-$C_{30}$ alkanols, more particularly with $C_1$-$C_{10}$ alkanols, such as methyl 2-tert-butyl acrylate, methacrylate, methyl methacrylate, ethyl acrylate, ethyl methacrylate, butyl acrylate, butyl methacrylate, 2-ethylhexyl acrylate, 2-ethylhexyl methacrylate, benzyl acrylate, benzyl methacrylate, lauryl acrylate, lauryl methacrylate, oleyl acrylate, oleyl methacrylate, palmityl acrylate, palmityl methacrylate, stearyl acrylate, stearyl methacrylate, and mixtures thereof. The term "(meth)acrylate" here embraces both the corresponding ester of acrylic acid and the corresponding ester of methacrylic acid.

Suitable vinylaromatics are styrene, 2-methylstyrene, 4-methylstyrene, 2-(n-butyl)styrene, 4-(n-butyl)styrene, 4-(n-decyl)styrene, α-methylstyrene, and mixtures thereof, more particularly styrene, α-methylstyrene, and mixtures thereof.

Particularly suitable esters of 2-phenylacrylic acid are the methyl ester, ethyl ester, n-propyl ester, and n-butyl ester.

Particularly suitable esters of atropic acid are the methyl ester, ethyl ester, n-propyl ester, and n-butyl ester.

Other plasticizer monomers are listed in J. Brandrup, E. H. Immergut, Polymer Handbook 3rd Edition, 11/316ff.

Particularly preferably used as plasticizer monomers in step iv) are styrene or α-methylstyrene.

In order to ensure that there is no substantial flow of radicals under which the plasticizer monomers can polymerize there are various means, such as the addition of one or more polymerization inhibitors, the addition of one or more reducing agents, waiting for a sufficient time for there to be no longer any significant number of free radicals present, on account of termination thereof, the cooling of the reactor contents to limit the reactivity of the free radicals and also the formation of new radicals by thermal decomposition, and also combinations of these measures.

One preferred means includes the adding of one or more polymerization inhibitors. Suitable polymerization inhibitors are selected from N,N-diethylhydroxylamine, N-nitrosodiphenylamine, 2,4-dinitrophenylhydrazine, p-phenylenediamine, phenathiazine, alloocimene, triethyl phosphite, 4-nitrosophenol, 2-nitrophenol, p-aminophenol, 4-hydroxy-TEMPO (also known as 4-hydroxy-2,2,6,6-tetramethyl-piperidinyloxy, free radical), hydroquinone, p-methoxyhydroquinone, tert-butyl-p-hydroquinone, 2,5-di-tert-butyl-p-hydroquinone, 1,4-naphthalenediol, 4-tert-butyl-1-catechol, copper sulfate, copper nitrate, cresol, and phenol.

Typical reducing agents are reductive sulfur compounds, examples being bisulfites, sulfites, sulfinates, thiosulfates, dithionites, and tetrathionates of alkali metals and ammonium compounds and their adducts such as sodium hydroxymethylsulfinates and acetone bisulfites, and also reductive polyhydroxy compounds such as carbohydrates and derivatives thereof such as, for example, ascorbic acid, isoascorbic acid, and their salts (e.g. sodium erythorbate). If used, the polymerization inhibitors or reducing agents are added in an effective amount which halts essentially any polymerization, generally 25 to 5000 parts per million ("ppm"), preferably 50 to 3500 ppm, based on the polymer solids. The polymerization inhibitors(s) or reducing agent(s) are preferably added while the multistage polymer is at or below the temperature at which the shell stage polymer has been polymerized.

If step iv) is carried out in the presence of a plasticizer monomer, the fraction of the plasticizer monomer is in the range from 0.5 to 20 wt %, based on the total weight of the emulsion polymer, preferably 2.0 to 10.0 wt %, based on the total weight of the emulsion polymer.

Step v) and Step vi):

Following step iv), in a further step v), by radical polymerization of the dispersion of polymer particles that is obtained in step iv), further shells may be formed by addition of further shell-forming monomers M5.

The monomers M5 are defined above.

Preferably at least one monomer M5-1 in step v) is selected from vinylaromatics, esters of vinyl alcohol and allyl alcohol with $C_1$-$C_{30}$ monocarboxylic acids, and mixtures thereof.

At least one monomer M5-1 in step v) is especially selected from styrene, allyl methacrylate, and mixtures thereof.

The monomer M5-2 in step v) is preferably selected from M5-2a2. More particularly the monomer M5-2 in step v) is selected from acrylic acid and methacrylic acid, especially methacrylic acid.

Optionally in a further step vi), at least one further shell of the emulsion polymer particles obtained in step v) may be formed in a radical aqueous emulsion polymerization in the presence of at least one of the monomers M5, as defined above.

Further to the monomers M1, M2, M3, M4, M5, and plasticizer monomers, steps i), ii), iii), iv), v), and vi) may comprise one or more monomers M6. M6 is selected from hydroxy-$C_2$-$C_4$ alkyl esters of monoethylenically unsaturated $C_3$-$C_8$ monocarboxylic acids, and mixtures thereof.

Examples of hydroxy-$C_2$-$C_4$ alkyl esters of monoethylenically unsaturated $C_3$-$C_8$ monocarboxylic acids that are suitable as M6 are the hydroxy-$C_2$-$C_4$ alkyl esters of acrylic acid and of methacrylic acid such as 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, and mixtures thereof.

The glass transition temperature of the core stage polymer, determined in accordance with the Fox equation (John Wiley & Sons Ltd., Baffins Lane, Chichester, England, 1997), in the protonated state is in the range from −20° C. to 150° C.

If polymerization takes place in aqueous solution or dilution, then the monomers M1 to M6 and plasticizer monomers may be wholly or partly neutralized by bases prior to or during the polymerization. Bases which can be used include, for example, alkali metal or alkaline earth metal compounds such as sodium hydroxide, potassium hydroxide, calcium hydroxide, magnesium oxide, sodium carbonate; ammonia; primary, secondary, and tertiary amines, such as ethylamine, propylamine, monolsopropylamine, monobutylamine, hexylamine, ethanolamine, dimethylamine, diethylamine, di-n-propylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminethylamine, 2,3-diaminopropene, 1,2-propylenediamine, dimethylaminopropylamine, neopentanediamine, hexamethylenediamine, 4,9-dioxadodecane-1,12-diamine, polyethylenimine, polyvinylamine, or mixtures of those listed.

The polymers may be prepared by customary polymerization processes of emulsion polymerization. Preference is given to operation in the absence of oxygen, preferably in a stream of nitrogen. For the polymerization method the customary apparatus is used, examples being stirred tanks, stirred tank cascades, autoclaves, tubular reactors, and kneading apparatus. The polymerization may be performed in solvents or diluents, such as, for example, toluene, o-xylene, p-xylene, cumene, chlorobenzene, ethylbenzene, technical mixtures of alkylaromatics, cyclohexane, technical aliphatic mixtures, acetone, cydohexanone, tetrahydrofuran, dioxane, glycols and glycol derivatives, polyalkylene glycols and their derivatives, diethyl ether, tert-butyl methyl ether, methyl acetate, isopropanol, ethanol, water or mixtures, such as isopropanol/water mixtures, for example.

The polymerization may be carried out at temperatures of 20° C. to 300° C., preferably of 50° C. to 200° C.

The polymerization is carried out preferably in the presence of compounds which form radicals. Up to 30 wt % of these compounds is required, preferably 0.05 to 15 wt %, more preferably 0.2 to 8 wt %, based on the monomers used in the polymerization. In the case of multicomponent initiator systems (e.g., redox initiator systems), the weight figures above are based on the sum total of the components.

Useful polymerization initiators include, for example, peroxides, hydroperoxides, peroxodisulfates, percarbonates, peroxy esters, hydrogen peroxide and azo compounds. Examples of initiators, which can be water soluble or else water insoluble, are hydrogen peroxide, dibenzoyl peroxide, dicyclohexyl peroxydicarbonate, dilauroyl peroxide, methyl ethyl ketone peroxide, di-tert-butyl peroxide, acetylacetone peroxide, tert-butyl hydroperoxide, cumene hydroperoxide, tert-butyl perneodecanoate, tert-amyl perpivalate, tert-butyl perpivalate, tert-butyl pemeohexanoate, tert-butyl per-2-ethyl-hexanoate, tert-butyl perbenzoate, lithium peroxodisulfate, sodium peroxodisulfate, potassium peroxodisulfate, ammonium peroxodisulfate, azobisisobutyronitrile, 2,2'-azobis(2-amidinopropane) dihydrochloride, 2-(carbamoylazo)isobutyronitrile and 4,4-azobis(4-cyanovaleric acid).

The initiators may be used alone or mixed with each or one another, for example mixtures of hydrogen peroxide and sodium peroxodisulfate. Polymerization in an aqueous medium preferably utilizes water-soluble initiators.

The familiar redox initiator systems can also be used as polymerization initiators. Redox initiator systems of this type comprise one or more than one peroxide-containing compound combined with a redox co-initiator, e.g., sulfur compounds having a reducing effect, examples being bisulfites, sulfites, sulfinates, thiosulfates, dithionites and tetrathionates of alkali metals and ammonium compounds and their adducts such as sodium hydroxymethylsulfinates and acetone bisulfites and also ascorbic acid, isoascorbic acid and sodium erythorbate. Combinations of peroxodisulfates with alkali metal or ammonium hydrogensulfites can accordingly be used, an example being ammonium peroxodisulfate combined with ammonium disulfite. The ratio of peroxide-containing compound to redox co-initiator is 30:1 to 0.05:1.

Transition metal catalysts may additionally be used in combination with the initiators and/or the redox initiator systems, examples being salts of iron, cobalt, nickel, copper, vanadium and manganese. Useful salts include, for example, iron(II) sulfate, cobalt(II) chloride, nickel(II) sulfate, copper (I) chloride. Based on monomers to be polymerized, or on monomers to be polymerized in any one stage, the reducing transition metal salt is used in a concentration of 0.1 ppm to 1000 ppm. Combinations of hydrogen peroxide with iron(II) salts can accordingly be used, an example being 0.5 to 30% of hydrogen peroxide being combined with 0.1 to 500 ppm of Mohr's salt.

Similarly, polymerization in organic solvents may combine the abovementioned initiators with redox co-Initiators and/or transition metal catalysts, examples being benzoin, dimethylaniline, ascorbic acid and also organo soluble complexes of heavy metals, such as copper, cobalt, iron, manganese, nickel and chromium. The customarily used amounts of redox co-initiators and/or transition metal catalysts are here customarily about 0.1 to 1000 ppm, based on the amounts of monomers used.

When the reaction mixture is incipiently polymerized at the lower limit of the temperature range for the polymerization and then fully polymerized at a higher temperature, it is advantageous to use two or more different Initiators or Initiator systems that decompose at different temperatures, so an adequate concentration of radicals is available within every temperature interval, or to use a redox initiator system wherein the peroxide-containing component is initially activated by a co-initiator at a low temperature and thermally decomposes at a higher temperature without a continued need for co-initiator.

The initiator can also be added in stages, and/or the rate of initiator addition varied over time.

To obtain polymers of low average molecular weight, it is often advantageous to conduct the copolymerization in the presence of chain transfer agents. The chain transfer agents used for this may be customary chain transfer agents, for example organic SH-containing compounds, such as 2-mercaptoethanol, 2-mercaptopropanol, mercaptoacetic acid, tert-butyl mercaptan, n-octyl mercaptan, n-dodecyl mercaptan and tert-dodecyl mercaptan, $C_1$-$C_4$ aldehydes, such as formaldehyde, acetaldehyde, propionaldehyde, hydroxylammonium salts such as hydroxylammonium sulfate, formic acid, sodium bisulfite, hypophosphorous acid and/or salts thereof, or isopropanol. Chain transfer agents are generally used in amounts of 0.1 to 20 wt %, based on the monomers. The choice of a suitable solvent is another way to influence the average molecular weight. Thus, polymerization in the presence of diluents having benzylic hydrogen atoms, or in the presence of secondary alcohols such as, for example, isopropanol, leads to a reduction in the average molecular weight through chain transfer.

Polymers of low or comparatively low molecular weight are also obtained through: varying the temperature and/or the initiator concentration and/or the monomer feed rate.

To obtain comparatively high molecular weight copolymers, it is often advantageous to perform the polymerization in the presence of crosslinkers. These crosslinkers are compounds having two or more ethylenically unsaturated groups, for example diacrylates or dimethacrylates of at least dihydric saturated alcohols, e.g., ethylene glycol diacrylate, ethylene glycol dimethacrylate, 1,2-propylene glycol diacrylate, 1,2-propylene glycol dimethacrylate, 1,4-butanediol diacrylate, 1,4-butanediol dimethacrylate, hexanediol diacrylate, hexanediol dimethacrylate, neopentylglycol diacrylate, neopentylglycol dimethacrylate, 3-methylpentanediol diacrylate and 3-methylpentanediol dimethacrylate. The acrylic and methacrylic esters of alcohols having more than 2 OH groups can also be used as crosslinkers, examples being trimethylolpropane triacrylate or trimethylolpropane trimethacrylate. A further class of crosslinkers comprises diacrylates or dimethacrylates of polyethylene glycols or polypropylene glycols having molecular weights of 200 g/mol to 9000 g/mol in each case. Polyethylene and/or polypropylene glycols used for preparing the diacrylates or dimethacrylates preferably have a molecular weight of 400 g/mol to 2000 g/mol each. Not only the homopolymers of ethylene oxide and/or propylene oxide can be used, but also block copolymers of ethylene oxide and propylene oxide, or copolymers of ethylene oxide and propylene oxide, which comprise a random distribution of the ethylene oxide and propylene oxide units. Similarly, the oligomers of ethylene oxide and/or propylene oxide are useful for preparing the crosslinkers, examples being diethylene glycol diacrylate, diethylene glycol dimethacrylate, triethylene glycol diacrylate, triethylene glycol dimethacrylate, tetraethylene glycol diacrylate and/or tetraethylene glycol dimethacrylate.

Useful crosslinkers further include vinyl acrylate, vinyl methacrylate, vinyl itaconate, divinyl adipate, butanediol divinyl ether, trimethylolpropane trivinyl ether, allyl acrylate, allyl methacrylate, methylallyl methacrylate, diallyl phthalate, triallyl isocyanurate, pentaerythritol triallyl ether, triallylsucrose, pentaallylsaccharose, pentaallylsucrose, methylenebis(meth)acrylamide, divinylethylene urea, divinylpropylene urea, divinylbenzene, divinyldioxane, triallyl cyanurate, tetraallylsilane, tetravinylsilane and bis- or polyacryloylsiloxanes (e.g., Tegomers® from Evonik Industries AG).

Crosslinkers are preferably used in amounts of 0.1 to 70 wt %, based on the monomers to be polymerized or on the monomers to be polymerized in any one stage. Crosslinkers may be added in every stage.

It may further be advantageous to stabilize the monomer droplets and/or polymer particles with interface-active auxiliary materials. Emulsifiers or protective colloids are typically used for this purpose. Anionic, nonionic, cationic and amphoteric emulsifiers can be used. Anionic emulsifiers include, for example, alkylbenzenesulfonic acids, alkaline earth metal alkylbenzenesulfonates, sulfonated fatty acids, sulfonated olefins, sulfonated diphenyl ethers, sulfosuccinates, fatty alcohol sulfates, alkylphenol sulfates, alkyl polyglycol ether sulfates, fatty alcohol ether sulfates, fatty alcohol phosphates, alkylphenol phosphates, alkyl polyglycol ether phosphates, alkyl polyalkylene oxide phosphates, and fatty alcohol ether phosphates. Useful nonionic emulsifiers include, for example, alkylphenol ethoxylates, primary alcohol ethoxylates, fatty acid ethoxylates, alkanolamide ethoxylates, and fatty amine ethoxylates. Useful cationic and/or amphoteric emulsifiers include for example: quaternized aminealkoxylates, alkylbetaines, alkylamidobetaines and sulfobetaines.

Typical protective colloids include, for example, cellulose derivatives, polyvinyl acetate, polyvinyl alcohol, polyvinyl ether, starch and starch derivatives, dextran, polyvinylpyrrolidone, polyvinylpyridine, polyethyleneimine, polyvinylimidazole, polyvinylsuccinimide, polyvinyl-2-methylsuccinimide, polyvinyl-1,3-oxazolid-2-one, polyvinyl-2-methylimidazoline and maleic acid and/or maleic anhydride copolymers as described for example in DE 2 501 123.

Preference is given to using alkaline earth metal alkylbenzenesulfonates and alkyl polyglycol ether sulfates.

Emulsifiers or protective colloids are customarily used in concentrations of 0.05 to 20 wt %, based on the monomers to be polymerized or on the monomers to be polymerized in any one stage.

The polymerization may be carried out in a batch or continuous manner in any one of a multiplicity of versions. Customarily, some of the monomers are initially charged, optionally in a suitable diluent or solvent and optionally in the presence of an emulsifier, of a protective colloid or of further auxiliary materials, inertized and heated to the desired polymerization temperature. However, the initial charge may also merely comprise a suitable diluent. The radical initiator, further monomers and other auxiliary materials, e.g., chain transfer agents or crosslinkers, are each optionally added in a diluent within a defined period of time. Feed times may be chosen to differ in length.

For instance, a longer feed time may be chosen for the initiator feed than for the monomer feed.

When the polymer is produced in a steam-volatile solvent or solvent mixture, the solvent may be removed by introduction of steam in order that an aqueous solution or dispersion may be obtained in this way. The polymer may also be separated from the organic diluent via a drying operation.

The process of the invention delivers a distinctly higher scattering efficiency in paints and hence a distinct improvement in whiteness and also particles having a distinctly larger voidage. Polymer particle whiteness is greater than 70, preferably greater than 79.

The aqueous polymer dispersion obtainable by the process of the invention has an internal water content of 20% to 40%, particularly 25% to 35%, based on the total water content of the dispersion.

The relative internal water content is the fraction of the water population in the interior of the core-shell particles, based on the total water content of the sample. The internal water content can be determined by a pulsed field gradient $^1$H NMR experiment. The measurement method is described in more detail in the Examples section.

Where the polymer dispersions obtainable in accordance with the invention are used for painting, the average final particle size ought to be 100 to 600 nm, for use in paper and in cosmetics, 200 to 2500 nm, and, for foams, 300 to 800 nm.

In a paint, pigments that are typically used, especially $TiO_2$, may be replaced in whole or in part by the polymer dispersions described here and obtainable by the process of the invention. The components of such paints typically include water, thickener, base, pigment dispersant, associative thickener, defoamer, biocide, binder, and film-forming assistant.

The polymer dispersions obtainable by the process of the invention can be used for similar applications in other coatings consisting of resinous condensation products, such as phenolates and aminoplasts, examples being urea-formaldehyde and melamine-formaldehyde. It is similarly possible for them to be used in other coatings, based on water-dispersible alkyds, polyurethanes, polyesters, ethylene-vinyl acetates and also styrene-butadiene.

Using the polymer dispersions obtainable by the process of the invention in paper coatings leads to an increase in the paper gloss. This can be attributed to the shell, which is deformable under pressure, in contrast to inorganic pigments. Paper print quality is also boosted. Replacing inorganic pigments by the polymer dispersions described here, obtainable by the process of the invention, leads to a reduction in the density of the coating and hence to paper which is lighter in weight.

In cosmetics, the polymer dispersions obtainable by the process of the invention can be used, for example, in sun protection creams for boosting the photoprotective effect. The unusual light-scattering properties increase the likelihood of absorption of UV radiation by UV-active substances in the sun cream.

The polymer dispersions obtainable by the process of the invention can additionally be used in foams, crop protection compositions, thermoplastic molding compounds, and liquid inks.

A subject of the invention is an aqueous polymer dispersion obtainable by the process of the invention as described above.

Another subject of the invention is the use of the aqueous polymer dispersion of the invention in paints, paper coatings, foams, crop protection compositions, cosmetic compositions, liquid inks, or thermoplastic molding compounds.

Another subject of the invention is the use of the aqueous polymer dispersion of the invention to increase the whiteness in paints.

Another subject of the invention are paints comprising an aqueous polymer dispersion obtainable by the process of the invention.

Another subject of the invention is a paint in the form of an aqueous composition comprising
a) aqueous polymer dispersion and/or emulsion polymer particles as defined above,
b) at least one film-forming polymer, c) optionally organic fillers or inorganic fillers and/or
d) optionally further organic pigments or inorganic pigments,
e) optionally at least one customary auxiliary, and
f) water.

Suitable film-forming polymers may be aqueous emulsion polymers based on purely acrylate polymers and/or styrene-acrylate polymers, and also any further film-forming polymers for coatings consisting of resinous condensation products comprising phenolates and aminoplasts and also comprising urea-formaldehyde and melamine-formaldehyde. It is similarly possible to use further polymers based on water-dispersible alkyds, polyurethanes, polyesters, ethylene-vinyl acetates and also styrene-butadiene.

Suitable fillers in clearcoat systems include, for example, matting agents to thus substantially reduce gloss in a desired manner. Matting agents are generally transparent and may be not only organic but also inorganic. Inorganic fillers based on silica are most suitable and are widely available commercially. Examples are the Syloid@ brands of W.R. Grace & Company and the Acematt® brands of Evonik Industries AG. Organic matting agents are for example available from BYK-Chemie GmbH under the Ceraflour® and the Ceramat® brands, from Deuteron GmbH under the Deuteron MK® brand. Suitable fillers for emulsion paints further include aluminosilicates, such as feldspars, silicates, such as kaolin, talc, mica, magnesite, alkaline earth metal carbonates, such as calcium carbonate, for example in the form of calcite or chalk, magnesium carbonate, dolomite, alkaline earth metal sulfates, such as calcium sulfate, silicon dioxide, etc. The preference in paints is naturally for finely divided fillers. The fillers can be used as individual components. In practice, however, filler mixtures have been found to be particularly advantageous, examples being calcium carbonate/kaolin and calcium carbonate/talc. Gloss paints generally include only minimal amounts of very finely divided fillers or contain no fillers at all.

Finely divided fillers can also be used to enhance the hiding power and/or to economize on white pigments. Blends of fillers and color pigments are preferably used to control the hiding power of the hue and of the depth of shade.

Suitable pigments include, for example, inorganic white pigments such as titanium dioxide, preferably in the rutile form, barium sulfate, zinc oxide, zinc sulfide, basic lead carbonate, antimony trioxide, lithopone (zinc sulfide+barium sulfate) or colored pigments, for example iron oxides, carbon black, graphite, zinc yellow, zinc green, ultramarine, manganese black, antimony black, manganese violet, Prussian blue or Parisian green. In addition to inorganic pigments, the emulsion paints of the present invention may also comprise organic color pigments, for example sepia, gamboge, Cassel brown, toluidine red, para red, Hansa yellow, indigo, azo dyes, anthraquinonoid and indigoid dyes and also dioxazine, quinacridone, phthalocyanine, isoindolinone and metal-complex pigments. Also useful are the Luconyl® brands from BASF SE, e.g., Luconyl® yellow, Luconyl® brown and Luconyl® red, especially the transparent versions.

Customary auxiliaries include wetting or dispersing agents, such as sodium polyphosphates, potassium polyphosphates, ammonium polyphosphates, alkali metal and ammonium salts of acrylic acid copolymers or of maleic anhydride copolymers, polyphosphonates, such as sodium 1-hydroxyethane-1,1-diphosphonate, and also naphthalenesulfonic acid salts, in particular their sodium salts.

More importance attaches to the film-forming assistants, the thickeners and defoamers. Suitable film-forming assistants include, for example, Texanol® from Eastman Chemicals and the glycol ethers and esters as are commercially available for example from BASF SE, under the names Solvenon® and Lusolvan®, and from Dow Chemicals under the tradename Dowanol®. The amount is preferably <10 wt % and more preferably <5 wt %, based on overall formulation. It is also possible to formulate entirely without solvents.

Suitable auxiliaries further include flow control agents, defoamers, biocides and thickeners. Useful thickeners include, for example, associative thickeners, such as polyurethane thickeners. The amount of thickener is preferably less than 2.5 wt %, more preferably less than 1.5 wt % of thickener, based on paint solids content. Further directions regarding the formulation of wood paints are described at length in "water-based acrylates for decorative coatings" by the authors M. Schwartz and R. Baumstark, ISBN 3-87870-726-6.

The paints of the invention are produced in a known manner by blending the components in customary mixers. A tried and tested procedure is to first prepare an aqueous paste or dispersion from the pigments, water and optionally the auxiliaries and only then to mix the polymeric binder, i.e., generally the aqueous dispersion of the polymer, with the pigment paste or, respectively, pigment dispersion.

The paint of the invention can be applied to substrates in a conventional manner, e.g., by brushing, spraying, dipping, rolling or knifecoating.

The paints of the present invention are notable for ease of handling and good processing characteristics, and also for a high level of whiteness. The paints have a low noxiant content. They have good performance characteristics, for example good fastness to water, good adherence in the wet state, and good block resistance, good recoatability, and they exhibit good flow on application. The equipment used is easily cleaned with water.

The invention is illustrated by the following nonlimiting examples.

Experimental Methods

Determining the Glass Transition Temperature

The glass transition temperatures were determined by theoretical calculation by Fox equation (John Wiley & Sons Ltd., Baffins Lane, Chichester, England, 1997), the glass transition temperature used being that in the protonated state for polymers having carboxylic acid groups.

$$1/Tg = W_a T_{ga} + W_b T_{gb}, \text{ where}$$

Tga and Tgb=glass transition temperature of polymer "a" and "b"

Wa and Wb=weight fraction of polymer "a" and "b"

Measuring the Particle Size

The particle sizes here and in the appended claims were determined by means of hydrodynamic fractionation using a PSDA (Particle Size Distribution Analyser) from Polymer Labs. The Cartridge PL0850-1020 column type used was operated with a flow rate of 2 ml·min$^{-1}$. The samples were diluted with the eluent solution to an absorption of 0.03 AU·µl$^{-1}$.

The sample is eluted by the size exclusion principle in dependence on the hydrodynamic diameter. The eluent contains 0.2 wt % dodecyl poly(ethylene glycol ether)$_{23}$, 0.05 wt % sodium dodecyl sulfate, 0.02 wt % sodium dihydrogenphosphate, and 0.02 wt % sodium azide in deionized water. The pH is 5.8. The elution time is calibrated using PS calibration lattices. Measurement takes place in the range from 20 nm to 1200 nm. Detection is carried out using a UV detector at a wavelength of 254 nm.

The particle size may also be determined using a Coulter M4+(particle analyzer) or by means of photon correlation spectroscopy, also known as quasielastic light scattering or dynamic light scattering (ISO 13321 standard), using a HPPS (high performance particle sizer) from Malvern.

Carrying Out the Whiteness Measurement 6 g of the color paste described below and 1.04 g of the approximately 30% dispersion of hollow particles are weighed out into a vessel and the mixture is homogenized without stirred incorporation of air. Using a 200 μm coater, with a speed of 0.9 cm/sec, a film of this mixture is drawn down onto a black plastic film (matt finish, article No. 13.41 EG 870934001, Bernd Schwegmann GmbH & Co. KG, DE). The samples are dried at 23° C. and a relative humidity of 40 to 50% for 24 hours. Thereafter, using a Minolta CM-508i spectrophotometer, the whiteness is measured at three different locations. The measurement points are marked, for subsequent determination of the corresponding layer thicknesses of the color film with a micrometer screw, by differential measurement relative to the uncoated plastic film. After an average layer thickness has been calculated and after an average whiteness has been calculated from the three individual measurements, the final step is a standardization of the resulting whiteness to a dry film thickness of 50 μm by linear extrapolation. The calibration required for this purpose took place by measuring the whiteness of a standard dispersion of hollow particles in a dry film thickness range from about 30 to 60 μm.

Preparing the Color Paste

A vessel is charged with 185 g of water, after which the following ingredients are added in the order stated with a dissolver running at about 1000 rpm, with stirring to homogeneity for a total of about 15 minutes:

2 g of 20% strength sodium hydroxide solution, 12 g of Pigmentverteiler® MD 20 (copolymer of maleic acid and diisobutylene from BASF SE), 6 g of Agitan® E 255 (siloxane defoamer from Münzing Chemie GmbH), 725 g of Acronal® A 684 (binder, 50% dispersion from BASF SE), 40 g of Texanol® (film-forming assistant from Eastman Chemical Company), 4 g of Agitan® E 255 (siloxane defoamer from Münzing Chemie GmbH), 25 g of DSX 3000 (30% form, associative thickener: hydrophobic modified polyether (HMPE) from BASF SE), and 2 g of DSX 3801 (45% form, associative thickener: hydrophobic modified ethoxylated urethane (HEUR) from BASF SE).

Determining the Internal Water Content

The relative internal water content, i.e., the fraction of the water population in the interior of the core-shell particles, relative to the total water content of the sample, can be described by means of a pulsed field gradient $^1$H NMR experiment (Pulsed Field Gradient Nuclear Magnetic Resonance, PFG-NMR). In a system where the internal and external water populations are subject to diffuse exchange, an exact determination can be made by varying the diffusion times in accordance with Kärger (Annalen der Physik, 7th series, volume 27, issue 1, 1971, pp. 107-109). A linear approximation of this exchange model is possible in the region for which the effective diffusion time Δ of the PFG-NMR signal attenuation is very much smaller than the exchange time between the reservoirs. In the system described this is the case, for example, for variation of Δ between 7 and 10 ms, allowing the actual internal water content to be determined from the extrapolation to 0 ms. A requirement is that there are sufficiently strong gradient fields available. In the case of similar exchange times, a comparison of the internal water content may also be made approximately by comparing measurements over an individual short diffusion time. In the present case, the comparisons between similar polymers were carried out with variation of the gradient field strengths g to 800 G/cm with effective gradient pulse time δ=1 ms and a diffusion time of Δ=7 ms, using a stimulated gradient echo pulse sequence (Steijskal & Tanner, J. Chem. Phys., 1965, vol. 42, p. 288ff.) on a commercially available high-field NMR system (Bruker Biospin, Rheinstetten, Germany). The water signal was integrated from 5.8 to 3.7 ppm relative to the water signal maximum referenced internally at 4.7 ppm. The relative signal fractions of internal and external water were derived from the prefactors of a bi-exponential fit to the gradient-dependent PFG-NMR signal drop, with the sum of the two prefactors being standardized. The fitted effective diffusion coefficients in our example were of the order of $2 \cdot 10^{-9}$ m$^2$/s for external water and $5 \cdot 10^{-12}$ m$^2$/s for internal water. The error in the determination of the internal water content was around 1%, based on 100% total water content.

EXAMPLES

Starting Material:

Emulsifier 1: Alkyl polyglycol ether sulfates (30% form), Disponil® FES 993

Emulsifier 2: Alkylbenzenesulfonate, Disponil® LDBS 20

Polysiloxane 1: Polysiloxane-polyalkylene oxide graft copolymers, EFKA@ 3031 (solvent-free, BASF SE)

Polysiloxane 2: Polysiloxane-polyalkylene oxide graft copolymers, EFKA® 3288

Polysiloxane 3: Polyether-modified polysiloxane, PulpSil® 955S

Biocide: Acticid® MV (Thor)

Sodium hydroxymethanesulfinate: Rongalit-C

Preparing the Core-Shell Particles:

Example 1

Seed Dispersion A1:

The initial charge, consisting of 778.75 g of water and 35 g of emulsifier 1 (30%), was heated under a nitrogen atmosphere to a temperature of 80° C. in a polymerization vessel equipped with anchor stirrer, reflux condenser, and two feed vessels. When the temperature was reached, a solution of 402.5 g of water, 5.83 g of emulsifier 1 (30%), and 105 g of polysiloxane 1 was metered into the initial charge over 10 minutes. After the end of the feed, the feed vessel was rinsed with 17.5 g of water into the initial charge. Then 67.2 g of a 2.5 wt % aqueous sodium peroxodisulfate solution were added. After 5 minutes a preliminary emulsion, consisting of 123.94 g of water, 11.67 g of emulsifier 1 (30%), 240.45 g of methyl methacrylate, and 4.55 g of methacrylic acid, were metered together with 2.8 g of a 25 wt % aqueous ammonia solution, at 80° C. over 1 hour. After the end of the feed, the feed vessel was rinsed with 17.5 g of water into the initial charge. This was followed by a further 45 minutes of polymerization. After cooling to room temperature had taken place, 6 g of biocide and 22.5 g of rinsing water were added.

Solids content: 20.0%

Particle size (PSDA, median): 52 nm pH: 6.5

Example 2

Dispersion (Swell-Core) B1

The initial charge, consisting of 619.4 g of water, was heated under a nitrogen atmosphere to a temperature of 85° C. in a polymerization vessel equipped with anchor stirrer, reflux condenser, and two feed vessels. When the temperature was reached, 12.21 g of a 7 wt % sodium peroxodisulfate solution were added over 2 minutes, followed by 118.13 g of seed dispersion A1. After the end of the feed, the feed vessel was rinsed with 11.25 g of water into the initial charge. Thereafter a preliminary emulsion, consisting of 159.75 g of water, 19.5 g of emulsifier 1 (30%), 324 g of methyl methacrylate, and 126 g of methacrylic acid, was metered in over the course of 120 minutes at 85° C. Lastly, the feed vessel was rinsed with 22.5 g of water and polymerization was continued for 30 minutes.
Solids content: 33.6%
pH: 3.1
Particle size (PSDA, volume median): 157 nm

Example 3

Hollow Particle Dispersion $C_1$

The initial charge, consisting of 421.12 g of water and 107.69 g of dispersion B1, was heated under a nitrogen atmosphere to a temperature of 81° C. in a polymerization vessel equipped with anchor stirrer, reflux condenser, and two feed vessels. Following addition of 25.2 g of a 1.4 wt % sodium peroxodisulfate solution, the preliminary emulsion 1, consisting of 22 g of water, 2.2 g of emulsifier 2, 29.79 g of methyl methacrylate, 5.37 g of n-butyl methacrylate, and 0.77 g of methacrylic acid, was metered in over the course of 60 minutes. Thereafter the preliminary emulsion 2, consisting of 112.2 g of water, 14.96 g of emulsifier 2, 2.2 g of linseed oil fatty acids, 3.74 g of allyl methacrylate, and 252.3 g of styrene, together with 26.75 g of a 2.5 wt % sodium peroxodisulfate solution, was metered in over the course of 120 minutes. After the end of the feeds, 3.36 g of a 2.5 wt % sodium peroxodisulfate solution were added and the internal temperature was increased over 40 minutes to 92° C. Subsequently, over 10 minutes, 26.14 g of α-methylstyrene were added. After a further 20 minutes of stirring, 243 g of a 2.5 wt % sodium hydroxide solution were metered in over 20 minutes and incorporated by stirring for 20 minutes. Subsequently, over 15 minutes, preliminary emulsion 3, consisting of 44 g of water, 7 g of emulsifier 2, 0.31 g of methacrylic acid, and 79.8 g of styrene, was metered in. Five minutes after the end of the feed, 5.64 g of a 10 wt % aqueous solution of tert-butyl hydroperoxide were added, and 31 g of a 3 wt % aqueous sodium hydroxymethanesulfinate solution were metered in over 20 minutes. 30 minutes after the end of the feed, a further 9.16 g of a 10 wt % aqueous solution of tert-butyl hydroperoxide and 8.52 g of a 5.1 wt % aqueous sodium hydroxymethanesulfinate solution were metered in in parallel over 60 minutes.
Solids content: 31.3%
pH: 9.0
Particle size (PSDA, volume median): 413 nm
Whiteness: 81.5

Examples 4-8

Further seed dispersions were prepared in the same way as for example 1, with the additive used and the amounts of emulsifier being varied. The changes can be seen from the following table:

| Ex. | Additives/pphm* | | Amount of emulsifier 1/pphm | | Particle size (PSDA, median)/nm | pH |
|---|---|---|---|---|---|---|
| | | | Initial charge | Additive solution | | |
| 4 | Polysiloxane 1 | 30 | 3.00 | 0.10 | 88 | 6.5 |
| 5 | Polysiloxane 1 | 30 | 3.00 | 1.00 | 42 | 6.4 |
| 6 | Polysiloxane 1 | 30 | 3.00 | 2.00 | 38 | 6.4 |
| 7 | Polysiloxane 2 | 30 | 3.00 | 0.50 | 41 | 7.1 |
| 8 | Polysiloxane 3 | 30 | 3.00 | 0.50 | 65 | 6.3 |

*parts per hundred monomers (the additive used is treated as a monomer)

Examples 9-21

Further swell-core dispersions were prepared in the same way as for example 2. As well as the amount and particle size of the seed used, the amount of initiator was varied and additional emulsifier was included in the initial charge.

| Ex. | Seed/pphm | NaPS[a]/pphm | Emulsifier 1 in initial charge/pphm | Particle size (PSDA, median)/nm |
|---|---|---|---|---|
| 9 | Ex. 1 | 4.5 | 0.19 | — | 168 |
| 10 | Ex. 1 | 5.0 | 0.19 | — | 162 |
| 11 | Ex. 1 | 5.5 | 0.19 | — | 159 |
| 12 | Ex. 1 | 6.0 | 0.19 | — | 155 |
| 13 | Ex. 6 | 1.5 | 0.19 | — | 179 |
| 14 | Ex. 6 | 2.0 | 0.19 | — | 162 |
| 15 | Ex. 6 | 2.5 | 0.19 | — | 149 |
| 16 | Ex. 6 | 3.0 | 0.19 | — | 139 |
| 17 | Ex. 1 | 5.5 | 0.40 | — | 159 |
| 18 | Ex. 1 | 5.5 | 0.05/0.1[b] | — | 159 |
| 19 | Ex. 1 | 5.5 | 0.19 | 0.05 | 159 |
| 20 | Ex. 1 | 5.5 | 0.19[c] | — | 159 |
| 21 | Ex. 1[d] | 5.5 | 0.19 | — | 165 |

[a] sodium peroxodisulfate
[b] 0.05 pphm NaPS initial, 0.1 pphm metered parallel to the feed
[c] added after seed
[d] stored at 50° C. for 6 weeks

Comparative Example 1

Dispersion (Swell-Core) BC1

The initial charge, consisting of 477.7 g of water, 1.51 g of emulsifier 1, and 12.16 g of polysiloxane 1, was heated under a nitrogen atmosphere to a temperature of 82° C. in a polymerization vessel equipped with anchor stirrer, reflux condenser, and two feed vessels. Thereafter preliminary emulsion 1, consisting of 73.92 g of water, 0.25 g of emulsifier 1, 25.54 g of methyl methacrylate, and 0.34 g of methacrylic acid, and 14.55 g of a 7 wt % sodium peroxodisulfate solution, was added and polymerization took place for 30 minutes, the temperature within the polymerization vessel being adjusted to 85° C. Subsequently, preliminary emulsion 2, consisting of 555.01 g of water, 24.93 g of emulsifier 1, 332.32 g of methyl methacrylate, and 153.34 g of methacrylic acid, was metered in at 85° C. over the course of 120 minutes. Lastly, the feed vessel was rinsed with 10 g of water and polymerization was continued for 15 minutes.
Solids content: 33.3%
pH: 3.1
Particle size (PSDA, volume median): 140 nm

Comparative Examples 2 to 6

Further swell-core dispersions were prepared in the same way as for comparative example 1, with variations not only in the additive but also in the amount of initiator and emulsifier in the initial charge.

| Comp. ex. | Additive/pphm | NaPS/pphm | Emulsifier 1 in initial charge/pphm | Particle size (PSDA, median)/nm |
|---|---|---|---|---|
| 2 | Polysiloxane 2 | 2.21 | 0.19 | 0.08 | 110 |
| 3 | Polysiloxane 3 | 2.21 | 0.19 | 0.08 | 175 |
| 4 | Polysiloxane 1 | 2.21 | 0.19 | 0.09 | 131 |
| 5 | Polysiloxane 1 | 2.21 | 0.09/0.2[a] | 0.08 | 123 |
| 6 | Polysiloxane 1 | 2.21 | 0.40 | 0.08 | 178 |

[a] 0.09 pphm NaPS initial, 0.2 pphm metered parallel to the feed

Example 22 and Comparative Example 7

Two further hollow particle dispersions were prepared in the same way as for example 3, the seed used and the swell-core used, respectively, having been stored at 50° C. for six weeks.

| | Swell-core dispersion | Particle size (PSDA, median)/nm | pH | Whiteness |
|---|---|---|---|---|
| Ex. 22 | Ex. 21 | 425 | 9.2 | 81.7 |
| Comp. ex. 7 | Comp. ex.1 | 406 (multimodal) | 8.3 | 75.0 |

The invention claimed is:

1. A process for preparing an aqueous dispersion of polymer particles by radical aqueous emulsion polymerization, the process comprising:
   i) preparing an aqueous dispersion of a seed polymer by radical aqueous emulsion polymerization of an aqueous monomer emulsion comprising:
      a) 25.0 to 99.9 wt % of at least one nonionic, monoethylenically unsaturated monomer M1 having a water-solubility ≤50 g/L at 20° C.,
      b) 0 to 15.0 wt % of one or more monoethylenically unsaturated monomers M2 selected from the group consisting of a monomer M2a which comprises at least one anionic or anionogenic group and a neutral monomer M2b which has a water-solubility of >50 g/L at 20° C., and a mixture thereof,
      c) 0.1 to 60.0 wt % of at least one polyalkylene oxide-containing substance, based on a total weight of the monomers used in said preparing i) and of the polyalkylene oxide-containing substance;
   ii) preparing an aqueous dispersion of a swell-seed by radical aqueous emulsion polymerization of an aqueous suspoemulsion comprising:
      d) 5 to 99.9 wt % of at least one nonionic, monoethylenically unsaturated monomer M3 having a water-solubility ≤50 g/L at 20° C.,
      e) 0 to 75.0 wt % of one or more monoethylenically unsaturated monomers M4 selected from the group consisting of a monomer M4a which comprises at least one anionic or anionogenic group and a neutral monomer M4b which has a water-solubility of >50 g/L at 20° C., and a mixture thereof, and
      f) 0.1 to 20.0 wt % of the seed polymer obtained in said preparing i), based on a total weight of the monomers used in said preparing ii) and of the seed polymer;
   iii) subsequently forming at least one polymer shell by radical aqueous emulsion polymerization of at least one shell-forming monomer M5 in the presence of the swell-seed obtained in said preparing ii), to form an aqueous dispersion of emulsion polymer particles; and
   iv) subsequently neutralizing the aqueous dispersion obtained in said forming iii) to a pH of at least 7.5 with at least one base;
   wherein the polyalkylene oxide-containing substance is a polysiloxane-polyalkylene oxide copolymer, and
   wherein the aqueous dispersion of polymer particles has a whiteness after storing at 50° C. for 6 weeks of greater than 79.

2. The process according to claim 1, wherein a volume median of particle size of the seed polymer, determined by hydrodynamic fractionation, in an unswollen state ranges from 10 to 100 nm.

3. The process according to claim 1, wherein a volume median of particle size of the swell-seed, determined by hydrodynamic fractionation, in an unswollen state ranges from 50 to 300 nm.

4. The process according to claim 1, wherein the polysiloxane-polyalkylene oxide copolymer is at least one selected from the group consisting of a polysiloxane-polyalkylene oxide graft copolymer, and a polysiloxane-polyalkylene oxide graft copolymer with α-ω structure.

5. The process according to claim 1, wherein the polysiloxane-polyalkylene oxide copolymer is a polysiloxane-polyalkylene oxide copolymer, which is a polysiloxane-polyalkylene oxide graft copolymer of formula (I):

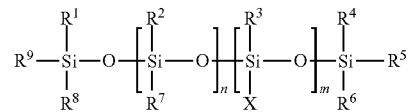

where
R, $R^2$, $R^3$, $R^4$, $R^5$, $R^6$, $R^7$, $R^8$, $R^9$ independently of one another are H or alkyl, OH, O-alkyl, allyl, O-allyl, phenyl or alkyl ester;
n is 0 to 1000;
m is 1 to 100; and
X has the following structure of formula (Ia):

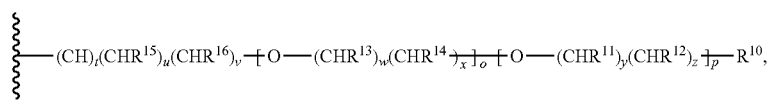

where
$R^{10}$ is OH, O-alkyl, O-allyl, O-phenyl or an alkyl ester;
$R^{11}$, $R^{12}$, $R^{13}$, $R^{14}$, $R^{15}$, $R^{16}$ independently of one another are H, alkyl or phenyl;
o is 0-100;
p is 1-100;
t is 0 or 2;
u is 0-10;

v is 0-10; and w, x, y, z independently of one another are 1-10.

6. The process according to claim 1, wherein said neutralizing iv) takes place in the presence of at least one polymerizable plasticizer monomer which is subsequently polymerized in a radical aqueous emulsion polymerization, optionally with addition of the further shell-forming monomer M5.

7. The process according to claim 6, wherein the at least one polymerizable plasticizer monomer is selected from the group consisting of a styrene, α-methylstyrene, methyl 2-tert-butylacrylate, 2-methyl-2-butene, 2,3-dimethyl-2-butene, 1,1-diphenylethene, an ester of 2-phenylacrylic acid, and an ester of atropic acid.

8. The process according to claim 1, further comprising
v) forming at least one further shell by radical aqueous emulsion polymerization of the shell-forming monomer M5 in the presence of the emulsion polymer particles obtained in said forming iii).

9. The process according to claim 1, wherein the monomer M1 is selected from the group consisting of an ester of monoethylenically unsaturated $C_3$-$C_8$ monocarboxylic acid with $C_1$-$C_{10}$ alkanol, an ester of monoethylenically unsaturated $C_4$-$C_8$ dicarboxylic acid with $C_1$-$C_{10}$ alkanol and a mixture thereof.

10. The process according to claim 1, wherein the monomer M2 is selected from the group consisting of a monoethylenically unsaturated $C_3$-$C_8$ monocarboxylic acid, a salt and an anhydride thereof, and a mixture thereof.

11. The process according to claim 1, wherein the monomer M3 is selected from the group consisting of an ester of monoethylenically unsaturated $C_3$-$C_8$ monocarboxylic acid with $C_{10}$-$C_{10}$ alkanol, an ester of monoethylenically unsaturated $C_4$-$C_8$ dicarboxylic acid with $C_1$-$C_{10}$ alkanol and a mixture thereof.

12. The process according to claim 1, wherein the monomer M4 is selected from the group consisting of a monoethylenically unsaturated $C_3$-$C_8$ monocarboxylic acid, a salt and an anhydride thereof, and a mixture thereof.

13. The process according to claim 1, wherein the shell-forming monomer M5 in said forming iii) is selected from the group consisting of a nonionic ethylenically unsaturated monomer M5-1 having a water-solubility ≤50 g/L at 20° C., a mixture thereof, and an ethylenically unsaturated monomer M5-2 selected from the group consisting of a monomer M5-2a which comprises at least one anionic or anionogenic group, a neutral monomer M5-2b which have a water-solubility of >50 g/L at 20° C., and a mixture thereof.

14. The process according to claim 13, wherein the monomers M5 comprise:
g) 25 to 100.0 wt % of at least one monomer M5-1, and
h) 0 to 75.0 wt % of at least one monomer M5-2,
based on a total weight of the monomers M5.

15. The process according to claim 13, wherein the monomer M5 is the monomer M5-1, which is at least one selected from the group consisting of an ester of monoethylenically unsaturated $C_3$-$C_8$ monocarboxylic acid with $C_1$-$C_{10}$ alkanol, an ester of monoethylenically unsaturated $C_4$-$C_8$ dicarboxylic acid with $C_1$-$C_{10}$ alkanol, a vinylaromatic, and an ester of vinyl alcohol or allyl alcohol with aliphatic $C_1$-$C_{10}$ monocarboxylic acid.

16. The process according to claim 13, wherein the monomer M5 is the monomer M5-2, which is at least one selected from the group consisting of a monoethylenically unsaturated $C_3$-$C_8$ monocarboxylic acid, a salt and an anhydride thereof, and an unsaturated fatty acid.

17. An aqueous polymer dispersion, obtained by the process according to claim 1.

18. The aqueous polymer dispersion according to claim 17, having an internal water content of 20% to 40%, based on a total water content of the dispersion.

19. A paint, comprising the aqueous polymer dispersion according to claim 17.

\* \* \* \* \*